(12) United States Patent
Seok et al.

(10) Patent No.: US 9,538,368 B2
(45) Date of Patent: Jan. 3, 2017

(54) METHOD FOR TRANSCEIVING DATA ON BASIS OF GROUPING IN WIRELESS LAN SYSTEM, AND DEVICE FOR SUPPORTING SAME

(71) Applicant: LG ELECTRONICS INC., Seoul (KR)

(72) Inventors: Yong Ho Seok, Anyang-si (KR); Jong Hyun Park, Anyang-si (KR); Hyang Sun You, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/357,963

(22) PCT Filed: Sep. 26, 2012

(86) PCT No.: PCT/KR2012/010039
§ 371 (c)(1),
(2) Date: May 13, 2014

(87) PCT Pub. No.: WO2013/077690
PCT Pub. Date: May 30, 2013

(65) Prior Publication Data
US 2014/0314054 A1     Oct. 23, 2014

Related U.S. Application Data

(60) Provisional application No. 61/563,597, filed on Nov. 24, 2011, provisional application No. 61/567,127, (Continued)

(51) Int. Cl.
*H04W 8/26* (2009.01)
*H04W 74/04* (2009.01)
*H04W 84/12* (2009.01)

(52) U.S. Cl.
CPC .............. *H04W 8/26* (2013.01); *H04W 74/04* (2013.01); *H04W 84/12* (2013.01)

(58) Field of Classification Search
CPC ........ H04W 8/26; H04W 74/04; H04W 84/12; H04W 84/10; H04W 84/02; H04W 40/244; H04W 52/54; H04W 52/0216
(Continued)

(56) References Cited

U.S. PATENT DOCUMENTS 7,245,946 B2   7/2007  Liu
7,457,973 B2   11/2008 Liu
(Continued)

FOREIGN PATENT DOCUMENTS

CN    101502044 A    8/2009
CN    101617506 A    12/2009
(Continued)

OTHER PUBLICATIONS

Association ID management for TGah, IEEE 802.11-11/0088r1, Suhwook Kim, LG Electronics, Jan. 16, 2011.
(Continued)

*Primary Examiner* — Kwang B Yao
*Assistant Examiner* — Syed M Bokhari
(74) *Attorney, Agent, or Firm* — Dentons US LLP

(57) ABSTRACT

Provided is a method for transceiving data in a wireless LAN system on the basis of a station (STA). The method comprises: receiving an allocation for an association ID (AID) by associating with an access point (AP); and exchanging data with the AP during the channel access period for an STA group comprising the STA. The STA group is grouped on the basis of the AID.

6 Claims, 31 Drawing Sheets

Related U.S. Application Data filed on Dec. 6, 2011, provisional application No. 61/682,557, filed on Aug. 13, 2012.

(58) Field of Classification Search
USPC .................. 370/311, 336, 329; 455/574, 458
See application file for complete search history.

(56) References Cited

U.S. PATENT DOCUMENTS

| | | | |
|---|---|---|---|
| 9,019,986 B2* | 4/2015 | Calcev | H04W 72/042 370/464 |
| 2002/0199015 A1* | 12/2002 | Tari | H04L 29/06 709/238 |
| 2004/0253996 A1* | 12/2004 | Chen | H04W 52/0216 455/574 |
| 2006/0165031 A1 | 7/2006 | Wang et al. | |
| 2008/0146253 A1* | 6/2008 | Wentink | H04W 52/0216 455/458 |
| 2010/0189021 A1 | 7/2010 | He et al. | |
| 2011/0122804 A1* | 5/2011 | Iyer et al. | 370/311 |
| 2012/0275362 A1* | 11/2012 | Park | H04W 74/02 370/311 |
| 2014/0112230 A1* | 4/2014 | Sammour | H04J 3/0605 370/311 |

FOREIGN PATENT DOCUMENTS

| | | |
|---|---|---|
| EP | 1903720 B1 | 10/2009 |
| JP | 2009088955 A | 4/2009 |
| KR | 1020110043497 A | 4/2011 |
| WO | 2007144688 A1 | 12/2007 |

OTHER PUBLICATIONS

"Association ID management for TGah", IEEE 802.11-11/0088r1, Kim, et al., LG Electronics, Jan. 16, 2011.

* cited by examiner

METHOD FOR TRANSCEIVING DATA ON BASIS OF GROUPING IN WIRELESS LAN SYSTEM, AND DEVICE FOR SUPPORTING SAME

This application is a 35 USC §371 National Stage entry of International Application No. PCT/KR2012/010039, filed on Nov. 26, 2012, which claims priority of U.S. Provisional Application No. 61/563,597, filed on Nov. 24, 2011, and 61/567,127, filed Dec. 6, 2011, 61/682,557 filed Aug. 13, 2012, all of which are hereby incorporated by reference in their entirety.

BACKGROUND OF THE INVENTION

Field of the Invention

The present invention relates to wireless communication, and more particularly, to a station (STA) grouping-based data transceiving method in a wireless LAN system and an apparatus for supporting the same.

Related Art

With the growth of information communication technology, various wireless communication technologies have been recently developed. Among others, Wireless Local Area Network (WLAN) is a technology that allows for wireless access to the Internet at home or business or in a specific service area using a handheld terminal such as a personal digital assistant (PDA), a laptop computer, a portable multimedia player (PMP), etc.

Unlike an existing wireless LAND system for supporting High Throughput (HT) and High Throughput (VHT) using 20/40/80/160/80+80 MHz bandwidth of 2 GHz and/or 5 GHz band, a wireless LAN system capable of being operated at a band less than 1 GHz is suggested. If the wireless LAN system is operated at a band less than 1 GHz, a service coverage by an access point AP may be expanded as compared with an existing LAN system. Accordingly, one AP manages more STAs.

If the number of STAs associated with the AP is considerably increased, a problem may occur in a Traffic Indication Map (TIM) protocol being a transceiving protocol for an STA operated in a power save mode and in a channel access operation of the STA. Accordingly, there is a need for a method where a wireless LAN system in which very many STAs coexist efficiently approaches a channel to transceive data.

SUMMARY OF THE INVENTION

The present invention to solve the above-described problems provides a grouping-based data transceiving method in a wireless area network system and an apparatus for supporting the same.

In an aspect, a method for transmitting and receiving data in a wireless local area network system is provided. The method performed by a station (STA) includes receiving an allocation for an association identifier (AID) by associating with an access point (AP), and exchanging data with the AP during a channel access period for an STA group tow which the STA belongs. The STA group is grouped on the basis of the AID.

The method may further include receiving an AID assignment frame from the AP, the AID assignment frame including an AID field to indicate a new AID to be assigned to the STA.

The method may further include exchanging data with the AP during a channel access period for a new STA group based on the new AID after the receiving of the AID assignment frame.

The method may further include transmitting an AID assignment request frame. The AID assignment frame may be received as a response to the AID assignment request frame.

The AID assignment request frame may include a device type field to indicate a device type of the STA.

The new AID may be determined based on the device type of the STA.

The AID assignment request frame may include a request group ID field to indicate a group ID of an STA group to which the STA belongs.

The new ID may be determined based on the group ID indicated by the request group ID.

In another aspect, a wireless apparatus for operating in a wireless local area network system is provided. The wireless apparatus includes a transceiver configured to transmit and receive a radio signal, and a processor functionally connected with the transceiver and configured to receive an allocation for an association identifier (AID) by associating with an access point (AP), and exchange data with the AP during a channel access period for an STA group tow which the STA belongs. The STA group is grouped on the basis of the AID.

A station (STA) grouping-based channel access method can perform STA grouping based on an association ID (AID) of an STA to group channel access periods as STA groups so that the channel access periods are assigned to the STA groups. Each STA group or each STA sub-group may exchange data with the AP during a channel access period assigned to each STA group or each STA sub-group. Therefore, the wireless LAN system with very many STAs can efficiently exchange data per STA group.

The STA may belong to a new STA group by assigning a new AID. The STA may request to assign an AID to be included in a desired STA. Accordingly, the STA may selectively receive assignment of a channel access period and access a channel during the assigned channel access period. Accordingly, data with the AP may be efficiently exchanged.

When the STA exchanges data with another STA through Tunneled Direct Link Setup (TDLS), the STA may request to assign an AID to be belonged to the same STA group as that of a peer STA. Accordingly, TDLS based communication is possible in a wireless LAN system on the basis of STA grouping.

DESCRIPTION OF EXEMPLARY EMBODIMENTS

Figure 1:
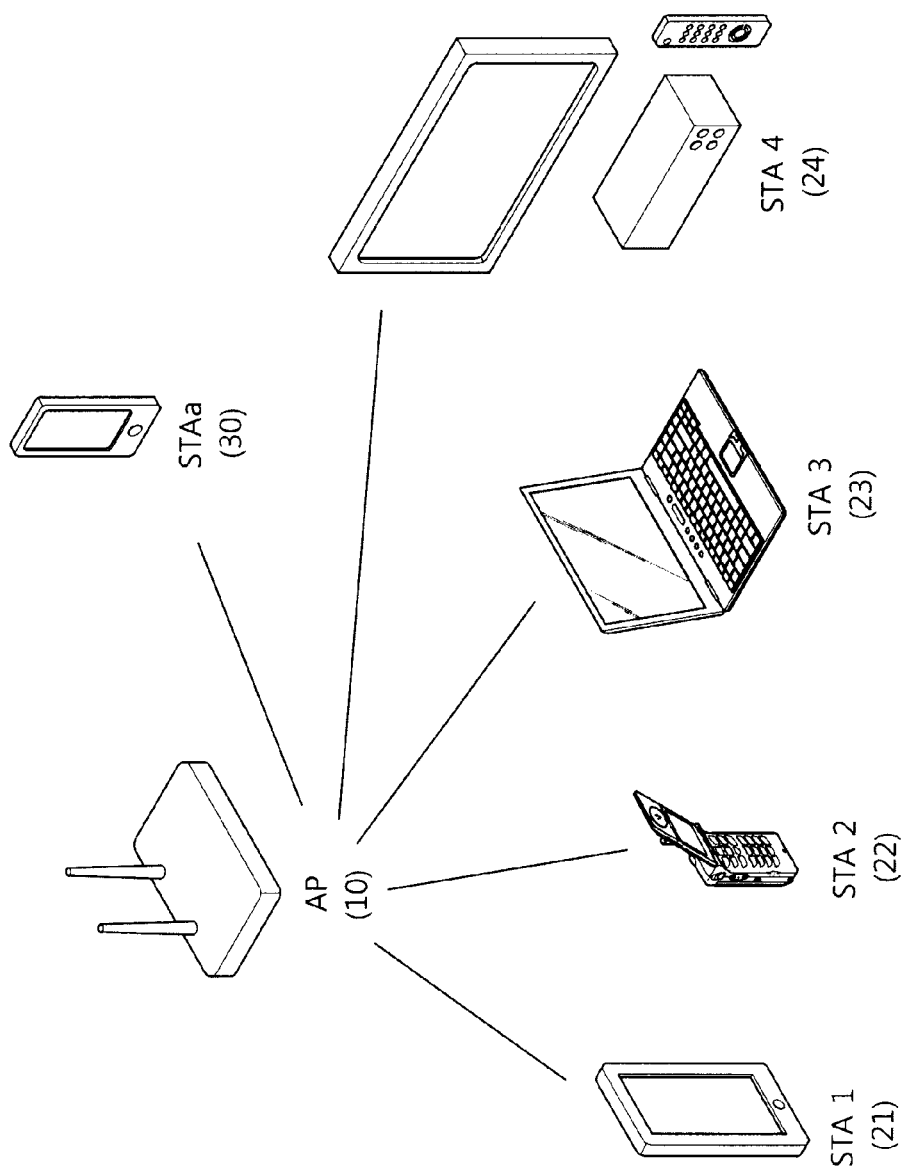
FIG. 1 is a view illustrating the configuration of a general Wireless Local Area Network (WLAN) system to which an embodiment of the present invention may apply.

FIG. 1 is a view illustrating the configuration of a general Wireless Local Area Network (WLAN) system to which an embodiment of the present invention may apply.

Referring to FIG. 1, the WLAN system includes one or more basic service sets (BSSs). A BSS is a set of stations (STAs) that may be successfully synchronized with each other and may communicate with each other, and is not a concept indicating a specific area.

An infrastructure BSS includes one or more non-Access Point (AP) stations (non-AP STA1 (21), non-AP STA2 (22), non-AP STA3 (23), non-AP STA4 (24), and non-AP STAa (30)), an AP 10 providing a distribution service, and a distribution system (DS) linking multiple APs. In the infrastructure BSS, the AP manages the non-AP STAs of the BSS.

In contrast, an independent BSS (IBSS) is a BSS operating in an ad-hoc mode. The IBSS does not include an AP and thus lacks a centralized management entity. That is, in the IBSS, non-AP STAs are managed in a distributed manner. In the IBSS, all the STAs may be mobile STAs, and due to no permission to access the DS, constitute a self-contained network.

The STA is any functional entity that includes a medium access control (MAC) and a physical layer interface for a radio medium that follow the Institute of Electrical and Electronics Engineers (IEEE) 802.11 standards and in broader concept includes an AP and a non-AP station.

A non-AP STA is a STA that is not an AP, and may also be referred to as a mobile terminal, wireless device, wireless transmit/receive unit (WTRU), user equipment (UE), mobile station (MS), mobile subscriber unit or simply user. Hereinafter, for ease of description, the non-AP STA is denoted STA.

The AP is a functional entity that provides access to a DS via a radio medium for a STA associated with an AP. In an infrastructure BSS including an AP, communication between STAs is in principle achieved via an AP, but in case a direct link is set up, the STAs may perform direct communication between each other. The AP may also be referred to as a central controller, base station (BS), node-B, BTS (Base Transceiver System), site controller, or managing STA.

A plurality of BSSs including the BSS shown in FIG. 1 may be connected to each other via a distribution system (DS). The plurality of BSSs linked with each other through a DS is referred to as an extended service set (ESS). The APs and/or STAs included in the ESS may communicate with each other, and in the same ESS, STAs may travel from one BSS to another BSS while maintaining seamless communication.

In the WLAN system according to IEEE 802.11, the basic access mechanism of Medium Access Control (MAC) is a Carrier Sense Multiple Access with Collision Avoidance (CSMA/CS) mechanism. The CSMA/CS mechanism is also referred to as Distributed Coordination Function (DCF) of IEEE 802.11 MAC, and basically, it adopts a "listen before talk" access mechanism. Following such type of access mechanism, an AP and/or STA senses a radio channel or medium prior to transmission. If as a result of the sensing, the medium is determined to be in idle state, frame transmission is initiated through the medium. On the contrary, if the medium is sensed to be in occupied state, the AP and/or STA sets a deferred time for medium access and waits without starting its own transmission.

The CSMA/CS mechanism includes virtual carrier sensing in addition to physical carrier sensing in which an AP and/or STA directly senses a medium. The virtual carrier sensing is to make up for a problem that may occur in connection with medium access, such as hidden node problem. In order for virtual carrier sensing, the MAC of the WLAN system makes use of a network allocation vector (NAV). The NAV is a value by which an AP and/or STA currently using a medium or having authority to use the medium informs other AP and/or STA of a time remaining until the medium turns available. Accordingly, the value set by the NAV corresponds to a period during which the use of the medium is scheduled by the AP and/or STA transmitting a frame.

The IEEE 802.11 MAC protocol, together with a DCF, offers a Hybrid Coordination Function (HCF) that is based on a Point Coordination Function (PCF) that periodically performs polling so that all receiving APs and/or STAs may receive data packets in polling-based synchronized access scheme with the DCF. The HCF has an Enhanced Distributed Channel Access (EDCA) that has a contention-based access scheme for providing data packets to multiple users and HCCA (HCF Controlled Channel Access) that uses contention free-based channel access scheme using a polling mechanism. The HCF includes a medium access mechanism for enhancing Quality of Service (QoS) of WLAN and may transmit QoS data in both a contention period (CP) and contention free period (CFP).

In the wireless communication system, a STA cannot be immediately aware of the existence of a network due to the characteristics of the radio medium when a STA powers on and starts operating. Accordingly, in order to access a network, a STA, whatever type it is, should go through a network discovery process. When discovering a network through the network discovery process, the STA selects a network to subscribe to through a network selection process. Thereafter, the STA subscribes to the selected network and performs data exchange at a transmission end/reception end.

In the WLAN system, the network discovery process is implemented as a scanning procedure. The scanning procedure is separated into passive scanning and active scanning. The passive scanning is achieved based on a beacon frame that is periodically broadcast by an AP. In general, an AP in the WLAN system broadcasts a beacon frame at a specific interval (for example, 100 msec). The beacon frame includes information on a BSS managed by it. The STA passively awaits reception of the beacon frame at a specific channel. When obtaining the information on the network by receiving the beacon frame, the STA terminates the scanning procedure at the specific channel. The STA need not transmit a separate frame in achieving passive scanning, and the passive scanning is rather done once the beacon frame is received. Accordingly, the passive scanning may reduce the overall overhead. However, it suffers from a scanning time that is increased in proportion to the transmission period of the beacon frame.

The active scanning is that the STA actively broadcasts a probe request frame at a specific channel to request that all the APs to receive the probe request frame send network information to the STA. When receiving the probe request frame, an AP waits for a random time so as to prevent frame collision, and then includes network information in a probe response frame, then transmits the probe response frame to the STA. The STA receives the probe response frame to thereby obtain the network information, and the scanning procedure is then ended. The active scanning may get scanning done relatively quickly, but may increase the overall network overhead due to the need of a frame sequence that comes from request-response.

When finishing the scanning procedure, the STA selects a network per a specific standard on itself and then performs an authentication procedure alongside the AP. The authentication procedure is achieved in 2-way handshake. When completing the authentication procedure, the STA proceeds with an association procedure together with the AP.

The association procedure is performed in two-way handshake. First, the STA sends an association request frame to the AP. The association request frame includes information on the STA's capabilities. Based on the information, the AP determines whether to allow association with the STA. When determining whether to allow association, the AP transmits an association response frame to the STA. The association response frame includes information indicating whether to allow association and information indicating the reason for association being allowed or failing. The association response frame further includes information on capabilities supportable by the AP. In case association is successfully done, normal frame exchange is done between the AP and STA. In case association fails, the association procedure is retried based on the information on the reason for the failure included in the association response frame or the STA may send a request for association to other AP.

In order to overcome limit to speed that is considered to be a weakness in WLAN, IEEE 802.11n has been established relatively in recent years. IEEE 802.11n aims to increase network speed and reliability while expanding wireless network coverage. More specifically, IEEE 802.11n supports high throughput (HT) that reaches data processing speed up to 540 Mbps and is based on MIMO (Multiple Inputs and Multiple Outputs) technology that adopts multiple antennas at both transmission end and reception end in order to optimize data speed and minimize transmission errors.

As WLAN spreads and more diversified applications using WLAN show up, a need for a new WLAN system arises for supporting a higher throughput than the data processing speed supported by IEEE 802.11n. The WLAN system supporting very high throughput (VHT) is a subsequent version of the IEEE 802.11n WLAN system, which is a new one recently suggested to support a throughput more than 500 Mbps for a single user and data processing speed more than 1 Gpbs for multiple users in an MAC service access point (SAP).

Advancing further than the existing WLAN system supporting 20 MHz or 40 MHz, the VHT WLAN system intends to support 80 MHz, contiguous 160 MHz, non-contiguous 160 MHz band transmission and/or more bandwidth transmission. Further, the VHT WLAN system supports 250 Quadrature Amplitude Modulation (QAM) that is more than a maximum of 64QAM of the existing WLAN system.

Since the VHT WLAN system supports a Multi User-Multiple Input Multiple Output (MU-MIMO) transmission method for higher throughput, the AP may transmit a data frame simultaneously to at least one or more MIMO-paired STAs. The number of paired STAs may be maximally 4, and when the maximum number of spatial streams is eight, each STA may be assigned up to four spatial streams.

Referring back to FIG. 1, in the WLAN system shown in the figure, the AP 10 may simultaneously transmit data to a STA group including at least one or more STAs among a plurality of STAs 21, 22, 23, 24, and 30 associated with the AP 10. In FIG. 1, by way of example, the AP conducts MU-MIMO transmission to the STAs. However, in a WLAN system supporting Tunneled Direct Link Setup (TDLS) or Direct Link Setup (DLS) or mesh network, a STA to transmit data may send a Physical Layer Convergence Procedure (PLCP) Protocol Data Unit (PPDU) to a plurality of STAs using an MU-MIMO transmission scheme. Hereinafter, an example where an AP transmits a PPDU to a plurality of STAs according to an MU-MIMO transmission scheme is described.

Data may be transmitted through different spatial streams to each STA. The data packet transmitted by the AP 10 may be referred to as a PPDU, which is generated at the physical layer of the WLAN system and transmitted, or a frame as a data field included in the PPDU. That is, the PPDU for Single User-Multiple Input Multiple Output (SU-MIMO) and/or MU-MIMO or data field included in the PPDU may be called a MIMO packet. Among them, the PPDU for MUs may be called an MU packet. In the example of the present invention, assume that a transmission target STA group MU-MIMO-paired with the AP 10 includes STA1 21, STA2 22, STA3 23, and STA4 24. At this time, no spatial stream is assigned to a specific STA in the transmission target STA group, so that no data may be transmitted to the specific STA. Meanwhile, assume that STAa 30 is associated with the AP but is not included in the transmission target STA group.

In the WLAN system, an identifier may be assigned to the transmission target STA group in order to support MU-MIMO transmission, and this identifier is denoted group ID. The AP sends a group ID management frame including group definition information for allocating group IDs to the STAs supporting MU-MIMO transmission and accordingly the group IDs are assigned to the STAs before PPDU transmission. One STA may be assigned a plurality of group IDs.

Table 1 below represents information elements included in the group ID management frame.

TABLE 1

| Order | Information |
|---|---|
| 1 | Category |
| 2 | VHT action |
| 3 | Membership status |
| 4 | Spatial stream position |

The category field and VHT action field are configured so that the frame corresponds to a management frame and to be able to identify being a group ID management frame used in a next-generation WLAN system supporting MU-MIMO.

As in Table 1, the group definition information includes membership status information indicating whether to belong to a specific group ID, and in case of belonging to the group ID, information indicating the number of position to which the spatial stream set of the STA corresponds in all the spatial streams according to MU-MAIMO transmission.

Since one AP manages a plurality of group IDs, the membership status information provided to one STA needs to indicate whether the STA belongs to each of the group IDs managed by the AP. Accordingly, the membership status information may be provided in the form of an array of subfields indicating whether it belongs to each group ID. The spatial stream position information indicates the position of each group ID, and thus, may be provided in the form of an array of subfields indicating the position of a spatial stream set occupied by the STA with respect to each group ID. Further, the membership status information and spatial stream position information for one group ID may be implemented in one subfield.

The AP, in case of sending a PPDU to a plurality of STAs through an MU-MIMO transmission scheme, transmits the PPDU, with information indicating a group identifier (group ID) in the PPDU as control information. When receiving the PPDU, a STA verifies whether it is a member STA of the transmission target STA group by checking the group ID field. If the STA is a member of the transmission target STA group, the STA may identify what number of position where the spatial stream set transmitted to the STA is located in the entire spatial stream. The PPDU includes information on the number of spatial streams allocated to the receiving STA, and thus, the STA may receive data by discovering the spatial streams assigned thereto.

Meanwhile, TV WS (White Space) draws attention as a newly available frequency band in the WLAN system. TV WS refers to an unused frequency band that is left as the analog TV broadcast is digitalized in the U.S. For example, TV WS includes a 54 to 598 MHz band. However, this is merely an example, and TV WS may be a permitted band that may be first used by a licensed user. The licensed user means a user that is permitted for use of a permitted band, and may also be referred to as a licensed device, primary user, or incumbent user.

The AP and/or STA operating in the TV WS should offer a protection function as to a licensed user, and this is because a licensed user has priority as to use of a TV WS band. For instance, in case a licensed user such as a microphone is already using a specific WS channel that is a frequency band split per protocol to have a certain bandwidth in the TV WS band, the AP and/or STA cannot use the frequency band corresponding to the WS channel in order to protect the licensed user. Further, the AP and/or STA should stop use of the frequency band if the licensed user happens to use the frequency band that is being used for transmission and/or reception of a current frame.

Accordingly, the AP and/or STA should first grasp whether a specific frequency band in the TV WS band is available, in other words, whether there is a licensed user in the frequency band. Grasping whether there is a licensed user in the specific frequency band is denoted spectrum sensing. As a spectrum sensing mechanism, an energy detection scheme or signature detection scheme may be utilized. If the strength of a received signal is higher than a predetermined value, it is determined that it is being used by a licensed user, or if a DTV preamble is detected, it may be determined to be being used by a licensed user.

Always sensing a channel for frame transmission and reception causes the STA to continue to consume power. The power consumption in the reception state makes little difference as compared with the power consumption in the transmission state, so that keeping the reception state causes the STA battery powered to consume relatively more power. Accordingly, when in the WLAN system a STA conducts channel sensing while continuously maintaining the reception waiting state, inefficient power consumption may arise without particularly increasing WLAN throughput, and thus, it is inappropriate in view of power management.

To compensate for such problems, the WLAN system supports a power management (PM) mode for a STA. The STA power management mode is separated into an active mode and a power save (PS) mode. The STA operates basically in the active mode. The STA operating in the active mode maintains an awake state. That is, the STA remains at a state of being able to perform normal operation such as frame transmission and reception or channel sensing.

When in normal operation, the STA shifts between the doze state and awake state. In the doze state, the STA operating with the minimum power and does not receive radio signals including data frames from the AP. Further, in the doze state, the STA does not conduct channel sensing.

As the STA operates as long as possible, power consumption decreases, so that the operation period of the STA is increased. However, since frame transmission and reception is impossible in the doze state, it cannot be left at the operation state unconditionally. In case there is a frame to be transmitted from the STA operating in the doze to the AP, the STA shifts to the awake state, thereby able to receive frames. However, in case the AP has a frame to be transmitted to the STA operating in the doze state, the STA cannot receive the frame nor is the STA able to be aware of the existence of the STA. Accordingly, the STA may require the operations of being aware of whether there is a frame to be sent to the STA, and if any, shifting to the awake state at a specific period so as to receive the frame. This is described below in connection with FIG. 2.

Figure 2:
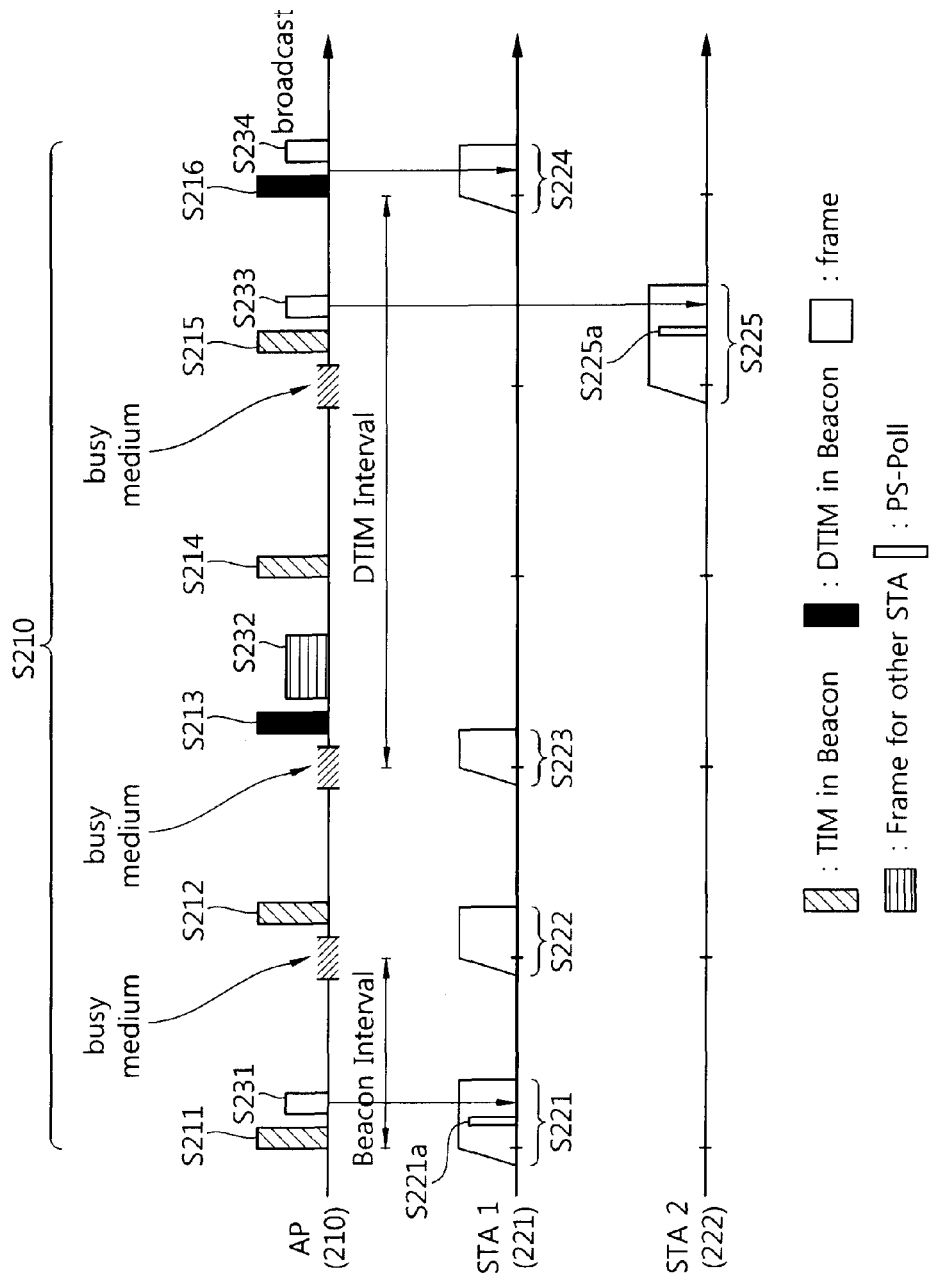
FIG. 2 is a view illustrating an example of power management operation.

FIG. 2 is a view illustrating an example of power management operation.

Referring to FIG. 2, the AP 210 sends a beacon frame to STAs in a BSS at a constant period (S210). The beacon frame includes a Traffic Indication Map (TIM) information element. The TIM element includes information indicating that the AP 210 buffers a bufferable frame (or bufferable unit; BU) for the STAs associated with the AP 210 and that the frame is to be sent. The TIM element includes a TIM used to indicate a unicast frame and a Delivery Traffic Indication Map (DTIM) used to indicate a multicast or broadcast frame.

The AP 210 transmits a DTIM once every three beacon frames of transmission.

STA1 221 and STA2 222 are STAs operating in PS mode. STA1 221 and STA2 222 shift from the doze state to the awake state at every wakeup interval of a specific period so that the STAs may receive the TIM element transmitted from the AP 210.

A specific wakeup interval may be configured so that STA1 221 may shift to the awake state at every beacon interval to thus receive a TIM element. Accordingly, when the AP 210 first sends out a beacon frame (S211), STA1 221 switches to the awake state (S221). STA1 221 receives the beacon frame and obtains the TIM element. In case the obtained TIM element indicates that a bufferable frame to be sent to STA1 221 is being buffered, STA1 221 transmits a PS-poll frame to the AP 210 to request that the AP 210 send a frame (S221a). In response to the PS-poll frame, the AP 210 sends a frame to STA1 221 (S231). When completely receiving the frame, STA1 221 turns back to the doze state.

When the AP 210 sends out a second beacon frame, since the medium is occupied, for example, as if another device gains access to the medium, the AP 210 fails to send a beacon frame at exact beacon interval and may deferred transmission of the beacon frame (S212). In such case, STA1 221 turns its operation mode to the awake state according to the beacon interval, but cannot receive the deferred beacon frame, so that STA1 221 switches back to the doze state (S222).

When the AP 210 sends out a third beacon frame, the beacon frame may include a TIM element that is set as DTIM. However, since the medium is occupied, the AP 210's transmission of the beacon frame is deferred (S213).

STA1 221 switches to the awake state in accordance with the beacon interval and may obtain the DTIM through the beacon frame transmitted by the AP 210. The DTIM obtained by STA1 221 indicates that there is no frame to be transmitted to STA1 221 and that there is a frame for other STA. Accordingly, STA1 221 shifts back to the doze state. The AP 210, after transmission of the beacon frame, sends a frame to the STA (S232).

The AP 210 sends a fourth beacon frame (S214). However, STA1 221 could not obtain the information indicating that a bufferable frame for itself remains buffered through the previous twice reception of the TIM element, and thus, STA1 221 may adjust the wakeup interval for reception of a TIM element. Or, in case the beacon frame transmitted by the AP 210 includes signaling information for adjusting the wakeup interval value of STA1 221, the wakeup interval value of STA1 221 may be adjusted. In this example, STA1 221 may change its configuration so that shift of the operation state for receiving a TIM element is performed at every three beacon intervals rather than at every beacon interval. Accordingly, STA1 221 stays at the doze state after the AP 210 sends a fourth beacon frame (S214) and when the AP 210 transmits a fifth beacon frame (S215), and thus, it cannot obtain the TIM element.

When the AP 210 sends out a sixth beacon frame (S216), STA1 221 switches to the awake state and obtains the TIM element included in the beacon frame (S224). The TIM element is a DTIM indicating that there is a broadcast frame, so that STA1 221 does not transmit a PS-poll frame to the AP 210 and receives a broadcast frame transmitted by the AP 210 (S234).

Meanwhile, the wakeup interval configured in STA2 222 may have a longer period than that of STA1 221. Accordingly, when the AP 210 sends a fifth beacon frame (S215), STA2 222 may switch to the awake state to receive a TIM element (S225). STA2 222 is aware that there is a frame to be sent thereto through the TIM element, and in order to request transmission, sends a PS-poll frame to the AP 210 (S225a). The AP 210 sends a frame to STA2 222 in response to the PS-poll frame (S233).

In order to operate the power save mode as shown in FIG. 2, the TIM element includes a TIM indicating whether there is a frame to be sent to the STA or a DTIM indicating whether there is a broadcast/multicast frame. The DTIM may be embodied by configuring a field of the TIM element.

Figure 3:
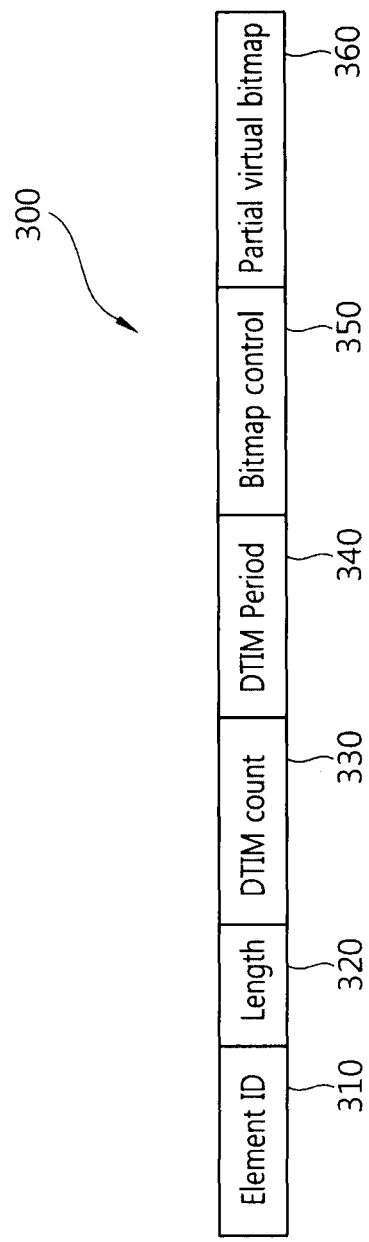
FIG. 3 is a block diagram illustrating an example of a TIM element format.

FIG. 3 is a block diagram illustrating an example of a TIM element format.

Referring to FIG. 3, the TIM element 300 includes an element ID field 310, a length field 320, a DTIM count field 330, a DTIM period field 340, a bitmap control field 350, and a partial virtual bitmap field 360.

The element ID field 310 indicates that an information element is a TIM element. The length field 320 indicates the whole length including itself and subsequent fields. The maximum value may be 255 and may be set in octets.

The DTIM count field 330 indicates whether a current TIM element is a DTIM, and unless it is a DTIM, indicates the number of remaining TIMs until the DTIM is transmitted. The DTIM period field 340 indicates a period at which the DTIM is transmitted, and the period at which the DTIM is transmitted may be set as a multiple of the count of transmission of a beacon frame.

The bitmap control field 350 and the partial virtual bitmap field 360 indicate whether a bufferable frame is buffered for a specific STA. The first bit in the bitmap control field 350 indicates whether there is a multicast/broadcast frame to be sent. The remaining bits are set to indicate an offset value to interpret the subsequent partial virtual bitmap field 360.

The partial virtual bitmap field 360 is set as a value indicating whether there is a bufferable frame to be sent to each STA. This may be set in the bitmap form where a bitmap corresponding to the AID value of a specific STA is set as 1. According to the AID order, allocation may be done from 1 to 2007, and as an example, if the fourth bit is set as 1, it means that traffic is buffered in the AP which is to be sent to the STA whose AID is 4.

Meanwhile, in the circumstance where bits set as consecutive 0's come up frequently in configuring the bit sequence of the partial virtual bitmap field 360, using the whole bit sequence configuring the bitmap may be insufficient. For this, the bitmap control field 350 may contain offset information for the partial virtual bitmap field 360.

Figure 4:
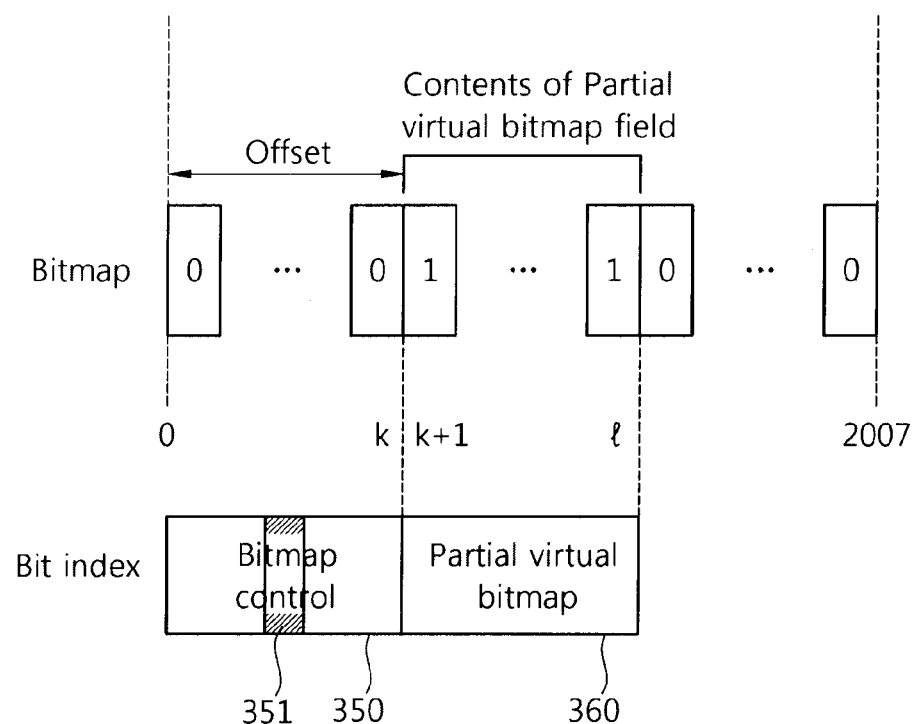
FIG. 4 is a view illustrating an example of a bitmap control field and a partial virtual bitmap field according to an embodiment of the present invention.

FIG. 4 is a view illustrating an example of a bitmap control field and a partial virtual bitmap field according to an embodiment of the present invention.

Referring to FIG. 4, the bitmap sequence constituting the partial virtual bitmap field 360 indicates whether the STA having an AID corresponding to the bitmap index includes a buffered frame. The bitmap sequence constitutes indication information on AIDs 0 to 2007.

The bitmap sequence may have consecutive 0's from the first bit to the kth bit. Further, consecutive 0's may be set from the other 1th bit to the last bit. This indicates that the STAs assigned AIDs 0 to k and the STAs assigned with 1 to 2007 do not have any buffered frame. As such, the sequence of consecutive 0's from $0^{th}$ to the kth in the early part of the bitmap sequence may be provided offset information and the sequence of 0's in the latter part may be omitted, thereby reducing the size of the TIM element.

For this, the bitmap control field 350 may include a bitmap offset subfield 351 that contains offset information of a sequence of consecutive 0's in the bitmap sequence. The bitmap offset subfield 351 may be set to indicate k, and the partial virtual bitmap field 360 may be set to include the k+1th bit to the l−1th bit of the original bitmap sequence.

A detailed responding procedure of the STA that has received the TIM element is described with reference to FIGS. 5 to 7.

Figure 5:
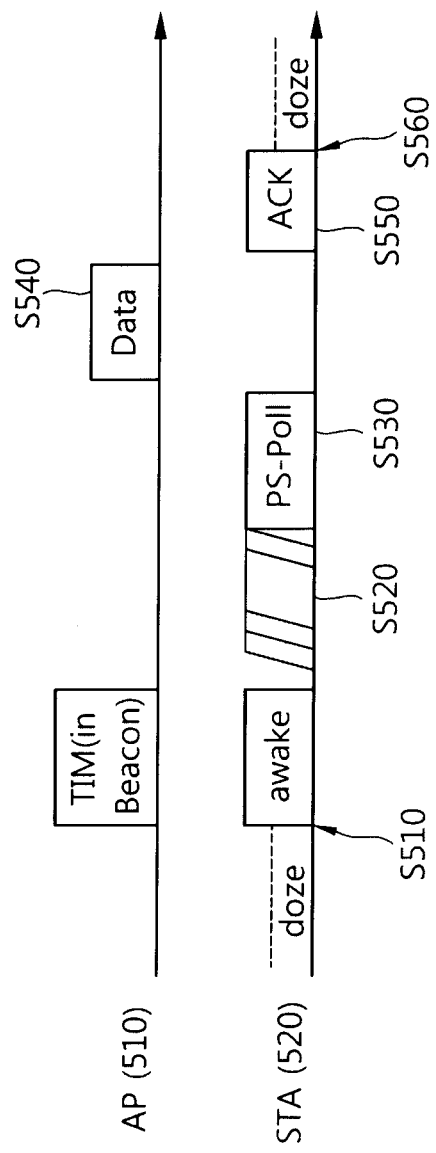
FIG. 5 is a flowchart illustrating an example of an AP's responding procedure in a TIM protocol.

FIG. 5 is a flowchart illustrating an example of an AP's responding procedure in a TIM protocol.

Referring to FIG. 5, the STA 520 shifts its operation state from doze state to awake state in order to receive a beacon frame including a TIM from the AP 510 (S510). The STA 520 may be aware that there is a buffered frame to be sent thereto by interpreting the received TIM element.

The STA 520 contends with other STAs for medium access to transmit a PS-poll frame (S520) and sends a PS-poll frame to the AP 510 for requesting transmission of a data frame (S530).

When receiving the PS-poll frame transmitted from the STA 520, the AP 510 sends a frame to the STA 520 (S540). The STA 520 receives the data frame and in response transmits an ACK (acknowledgement) frame to the AP 510 (S550). Thereafter, the STA 520 shifts its operating mode back into the doze state (S560).

The AP may transmit data at a specific time after receiving the PS-poll frame rather than sending a data frame right after receiving the PS-poll frame from the STA as shown in FIG. 5.

Figure 6:
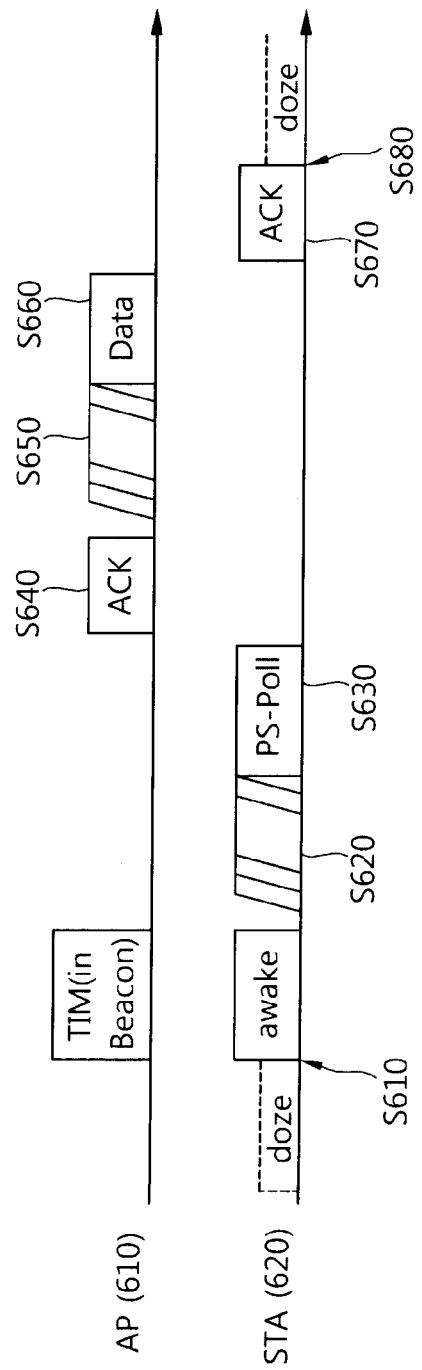
FIG. 6 is a flowchart illustrating another example of an AP's responding procedure in a TIM protocol.

FIG. 6 is a flowchart illustrating another example of an AP's responding procedure in a TIM protocol.

Referring to FIG. 6, the STA 620 shifts its operation mode from doze state to awake state in order to receive a beacon frame including a TIM from the AP 610 (S610). The STA 620 may be aware that there is a buffered frame to be sent thereto by interpreting the received TIM element.

The STA 620 contends with other STAs for medium access for transmission of the PS-poll frame (S620) and sends the PS-poll frame to the AP 610 for requesting the transmission of a data frame (S630).

In case, despite receiving the PS-poll frame, the AP 610 fails to prepare for a data frame for a specific time interval, the AP 610, instead of immediately transmitting a data frame, sends an ACK frame to the STA 620 (S640). This is a feature of a deferred response different from step S540 in which the AP 510 shown in FIG. 5 sends a data frame to the STA 520 immediately in response to the PS-poll frame.

The AP 610, if a data frame is ready after transmission of the ACK frame, performs contention (S650), and then sends a data frame to the STA 620 (S660).

The STA 620 sends an ACK frame to the AP 610 in response to reception of the data frame (S670) and switches its operation mode to the doze state (S680).

If the AP sends a DTIM to the STA, a TIM protocol procedure that is performed thereafter may differ.

Figure 7:
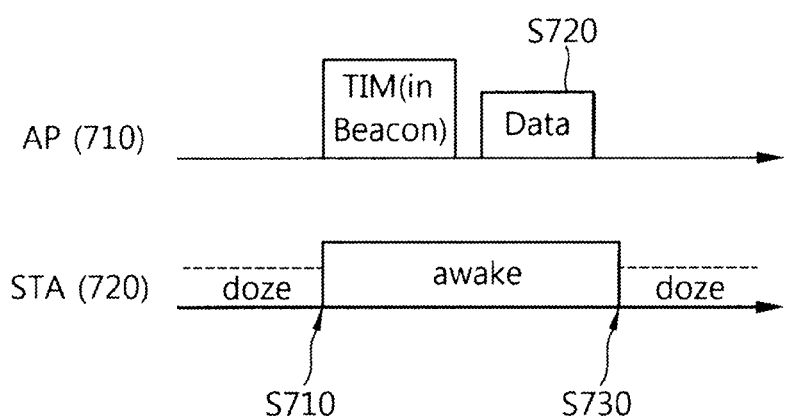
FIG. 7 is a flowchart illustrating a procedure of a TIM protocol by a DTIM.

FIG. 7 is a flowchart illustrating a procedure of a TIM protocol by a DTIM.

Referring to FIG. 7, STAs 720 switch their operation mode from the doze state to the awake state in order to receive a beacon frame including a TIM element (S710). The STAs 720 may be aware that a multicast/broadcast frame is to be transmitted through the received DTIM.

The AP 710 sends out a multicast/broadcast frame after transmission of the beacon frame including the DTIM (S720). The STAs 720 switch their operation state back to the doze state after receiving the multicast/broadcast frame transmitted by the AP 710.

In the power save mode operation method based on the TIM protocol described in connection with FIGS. 2 to 7, the STAs may verify whether there is a buffered frame to be transmitted due to buffered traffic through the STA identification information included in the TIM element. The STA identification information may be information associated with an Association Identifier (AID) that is an identifier assigned when the STA is associated with the AP. The STA identification information may be configured to directly indicate the AIDs of the STAs having a buffered frame or may be configured in the bitmap type in which a bit order corresponding to the AID value is set as a specific value. The STAs may be aware that there is a frame buffered thereto if the STA identification information indicates its AID.

Hereinafter, Tunneled Direct Link Setup (TDLS) is described.

The TDLS is a protocol to determine negotiation and method between STAs by the STAs in order to avoid and reduce network congestion. In order to support DLS between STAs supporting Quality of Service (QoS), management frames such as a DLS Setup request, a DLS setup response, and a DLS teardown may be transferred between STAs without help from the AP. The TDLS is based on encapsulation and transmission of management frames such as a DLS Setup request, a DLS setup response, and a DLS teardown to a data frame.

Figure 8:
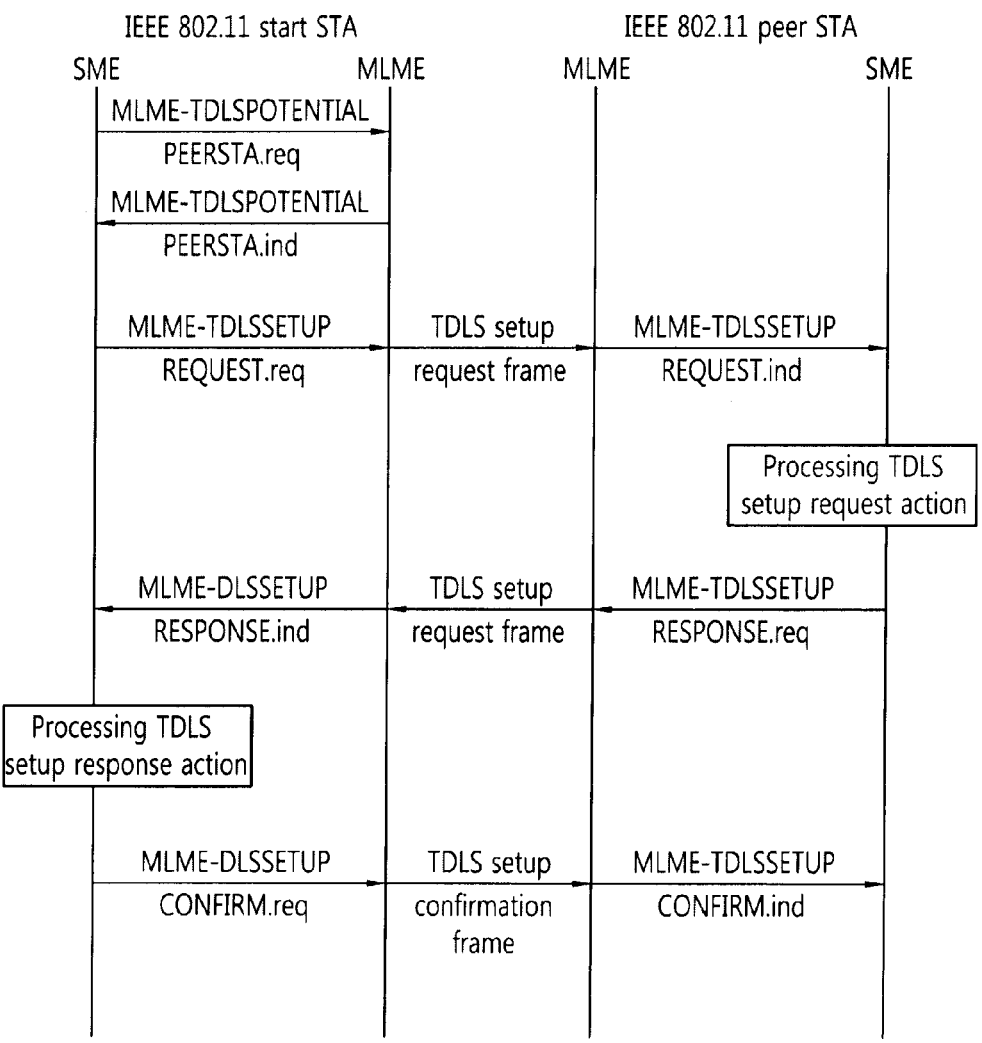
FIG. 8 is a diagram illustrating a signaling procedure to establish TDLS direct link.

A procedure of establishing TDLS direct link may be performed through signaling between two STAs as illustrated in FIG. 8.

FIG. 8 is a diagram illustrating a signaling procedure to establish TDLS direct link.

Referring to FIG. 8, a frame may be transceived between a TDLS initiating STA establishing TDLS direct link and a TDLS peer STA being a target of establishment of the TDLS direct link.

The TDLS direct link may be established where the TDLS initiating STA transmits a TDLS setup request frame to the TDLS peer STA through the AP, the TDLS peer STA transmits a TDLS setup response frame through the AP as a response to the TDLS setup request, and the TDLS initiating STA transmits a TDLS setup confirmation frame to the TDLS peer STA through the AP in order to confirm that the TDLS setup response frame is received.

When the TDLS direct link is established, the TDLS initiating STA and the TDLS peer STA may directly transceive the frame without through the AP.

In recent years, an M2M is attracting attention as a next generation communication technology. A next generation wireless LAN system supports the above M2M. Meanwhile, a TIM protocol to transceive a data frame of an STA operating in a power save mode in a current wireless LAN system needs to consider following M2M related characteristics in order to support the M2M.

1. A large number of STAs: in the next generation wireless LAN system supporting the M2M, the number of STAs associated with one AP may be significantly more than that of an existing wireless LAN system. That is, in the existing wireless LAN system, more STAs than 2007 being the maximum number of AIDs which can be assigned to the STA may be associated with the AP. In this case, if a reserved AID is used, the AID may be assigned to maximum 16383 STAs. A use case of the next generation wireless LAN system for supporting the M2M considers a case where at least 6000 STAs are associated with the AP.

2. Low transmission rate: there are a plurality of applications to support a low transmission rate in a wireless LAN system for supporting the M2M. Accordingly, when the size of bitmap type information included in the TIM element is large but the TIM element is transmitted with a low rate, a time taken to determine whether a buffered frame for an STA exists is increased as compared with that of the existing LAN system. In this case, the STA operating in the power save mode may unnecessarily consume power. Accordingly, there is a demand for a scheme capable of reducing an amount of bitmap type information of the TIM element.

3. Traffic with a very long interval: most of STAs for supporting the M2M has a traffic which periodically exchanges a small amount of data. Since a transmission period of the traffic is very long, the number of STAs with a frame capable of receiving from the AP during one beacon period is less than that of an existing LAN system.

When taking into consideration the foregoing related characteristics of the next generation wireless LAN system, if the sizes of the bitmap type information is large but most of the sizes thereof is 0, a method of compressing a format of the bitmap type information may be suggested. However, according to a current standard of the wireless LAN system, when the number of STAs exceeds 2008, an existing TIM element is not applicable as it is. This is because the size of the bitmap type information is considerably increased so that an existing frame format cannot support the bitmap type information.

A method of implementing information as illustrated in FIG. 4 is applicable to the method of compressing the bitmap type information. Accordingly, a sequence configuring real bitmap information may be implemented by a remaining bitmap sequence among entire bitmap sequences by omitting a sequence composed of continuous 0 at a part before the entire bitmap sequences indicating whether a buffered frame is included in each STA to provide offset information. In this case, when the number of STAs with the buffered frame is small but a difference of AIDs assigned to respective STAs is great, it may be inefficient. For example, if frames with respect to two STAs to which AIDs with values of 10 and 2000 are assigned are buffered, a length of the bitmap type information is 1990 but a value of the bitmap information except for both ends thereof is 0. That is, when the number of STAs associated with the AP is small, a great problem may not occur. However, when the number of STAs is increased so that a value of the assigned AID is increased, it may be difficult to significantly reduce the information by compressing the bitmap type information in this manner.

In a current WLAN system, the number of stations associated with the AP is several tens. However, when the M2M is supported, the number of association stations is rapidly increased. As described above, there is a need for an efficient operating method associated with an AID capable of being set to a very high value in a wireless LAN system in which the number of STA associated with the AP may be rapidly increased.

Hereinafter, a method of assigning AID to a large number of (for example, at least 2007) STAs so that the STAs efficiently approach a channel to transceive data is suggested. To this end, a method of grouping STAs is suggested.

STAs may be grouped as a plurality of STA groups. STAs grouped as one STA group may have the same traffic characteristic and/or may repeat active/inactive state with a duty cycle. In this manner, when the AP groups STAs, the AP may take into consideration characteristics and a performance value associated with the STA. Hereinafter, an STA grouping method based on characteristics of an STA will be described.

The AP may report whether there is a paging signal for an STA belonging to an STA group, that is, whether there is a buffered frame which STAs belonging to the STA group should receive. The paging signal may be the above TIM element. That is, an AID is assigned to each STA, and whether there is a buffered frame with respect to STAs belonging to the STA group may be indicated by a bitmap type with respect to AIDs.

When the AP efficiently manages the STA group, STAs belonging to a specific STA group need to receive assignment of an AID within a predetermined range. For example, if AID 1000, AID 2000, AID 3000, and AID 4000 are assigned to four STAs, respectively, a TIM should be individually encoded for respective AIDs. However, if AID 1001, AID 1002, AID 1003, and AID 1004 are assigned to four STAs, respectively, the TIM may be implemented by a bitmap with 4 bits. In this manner, if the closest AID value within a predetermined range is assigned to terminals belonging to the STA group, an overhead with respect to the TIM may be reduced and it may be advantageous to control channel access.

When the STA is associated with the AP, the STA may add device type and duty cycle related information to an association request frame.

In the device type case, a corresponding STA may periodically receive a beacon frame, and may indicate whether the STA is an STA to determine whether a buffered frame to be received through a TIM element of the beacon or an STA to confirm whether there is a frame buffered through an ACK frame with respect to a PS-fall frame by transmitting only the PS-fall frame. The device type may indicate whether a frequently used application by corresponding STA is a sensor traffic or cellular traffic offloading. That is, the device type may indicate a type of a service which may be provided by the STA.

In a case of the duty cycle, the STA may report inactive duration requested by the STA. If necessary, the STA may report active duration time together.

The AP determines a group to which the STA belongs based on a device type and/or a duty cycle of the STA. Further, the AP may select and assign an AID value within an AID range which terminals of a corresponding group have.

When a time point which the STA transmits an association request frame is not the same as that of an STA to which an AP belongs, the AP needs when a corresponding STA group is served. This may be called an AID activation offset.

It is assumed that a current beacon interval is a period when STAs with AID 1100 at AID 1000 awake to acquire a TIM element and accesses a channel. It is assumed that STAs with AID 1100 at AID 1000 have 1 second as the inactive duration.

When the inactive duration requested by an STA transmitting the association request frame is 10 seconds, it may be preferable that the STA is included in the same STA group as STAs with an inactive period of 10 seconds. However, if STAs belonging to the group awake after 50 beacon interval to acquire a TIM element, and access a channel, the AP assigns an AID belonging to a corresponding group to the STA and needs to report that a channel access period of a corresponding STA group stars after 50 beacon interval. The information is included in an association response frame so that the association response frame may be transferred to the STA together with an AID. In this case, a unit to indicate an active duration start time of a corresponding STA group may be a DTIM beacon interval in addition to a beacon interval. In this case, a start time of the DTIM beacon interval may be described together.

STA grouping based on an AID may be performed as follows.

ID information capable of identifying a group may be provided to each group. Hereinafter, information to identify the group is called group ID. The following provided group ID is ID information separately from the group ID for MU-MIMO.

There are various methods of grouping the STAs based on AIDs. As one example, specific number of bits before an AID assigned to the STA is used as the group ID. This may be implemented as illustrated in FIG. 9.

Figure 9:
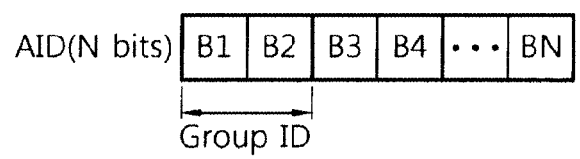
FIG. 9 is a diagram illustrating an example of an STA grouping method according to an embodiment of the present invention.

FIG. 9 is a diagram illustrating an example of an STA grouping method according to an embodiment of the present invention.

Referring to FIG. 9, first two bits B1 and B2 of an AID assigned to an STA may be set to indicate a group ID of the STA. In the embodiment, the group ID is implemented with two bits, total 4 group IDs may be implemented. All STAs associated with the AP may be grouped as total 4 groups. Meanwhile, the number of divided groups may differently set by adjusting the number of bits to indicate the group ID.

As another example of a method of grouping an STA based on an AID, a specific range of a plurality of AIDs is assigned to a specific STA group. For example, when a group ID 1 is expressed as offset A, length B, STAs to which AIDs of A to A+B−1 are includes in an STA group identified by a group ID 1. An example of the STA grouping may be implemented as illustrated in FIG. 10.

Figure 10:
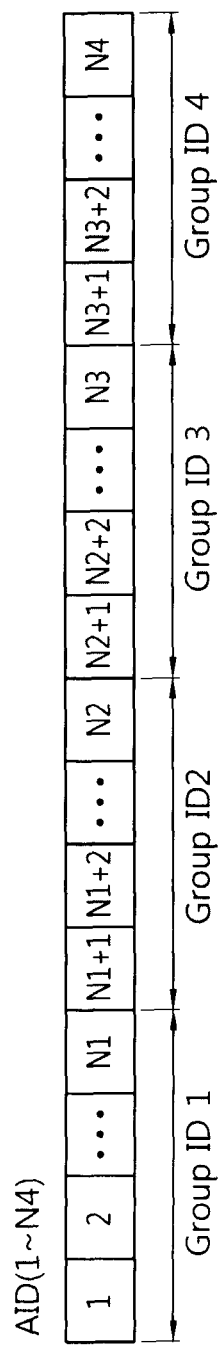
FIG. 10 is a diagram illustrating another example of an STA grouping method according to the embodiment of the present invention.

FIG. 10 is a diagram illustrating another example of an STA grouping method according to the embodiment of the present invention.

Referring to FIG. 10, it is assumed that entire AIDs are 1 to N4 AIDs, and an STA is grouped as total 4 STA groups.

AIDs belonging to a group ID 1 are 1 to N1 AIDs, which means that STAs to which AIDs 1 to N1 are assigned are grouped as an STA group according to a group ID 1. Meanwhile, corresponding AIDs may be expressed as offset 1, length N1.

AIDs belonging to a group ID 2 are N1+1 to N2, which means that STAs to which N1+1 to N2 AIDs are assigned are groups as an STA group according to a group ID 2. Meanwhile, corresponding AIDs may be expressed as offset N1+1, and length N2−N1.

AIDs belonging to a group ID 3 are N2+1 to N3 AIDs, which mean that STAs to which N2+1 to N3 AIDs are grouped as an STA group according to a group ID 3. Meanwhile, corresponding AIDs may be expressed as offset N2+1, length N3−N2.

AIDs belonging to a group ID 4 are N2+1 to N3 AIDs, which mean that STAs to which N2+1 to N3 AIDs are grouped as an STA group according to a group ID 4. Meanwhile, corresponding AIDs may be expressed as offset N3+1, length N4-N3. STAs to which the same group ID is assigned may be expressed by offset and a length of an AID.

Meanwhile, when STAs are grouped as shown in FIG. 10, the same number of AIDs is assigned to a group of each STA. If the number of groups in the STA is set to a square of 2, as illustrated in FIG. 9, specific bits before a group ID may be used as a group ID to identify an STA group.

According to FIG. 9 and FIG. 10, grouping of the STA may be achieved through one step. However, the grouping of the STA may be achieved through a plurality of steps. For example, entire STAs may be grouped as an STA group, and an STA included in a specific STA group may be grouped as an STA sub-group. In this case, the first specific bits of a bit sequence configuring an AID are a group ID to identify an STA group, and specific bits after the first specific bits of a bit sequence may be used as a sub-group index to identify an STA-sub group. This may be implemented as illustrated in FIG. 11.

Figure 11:
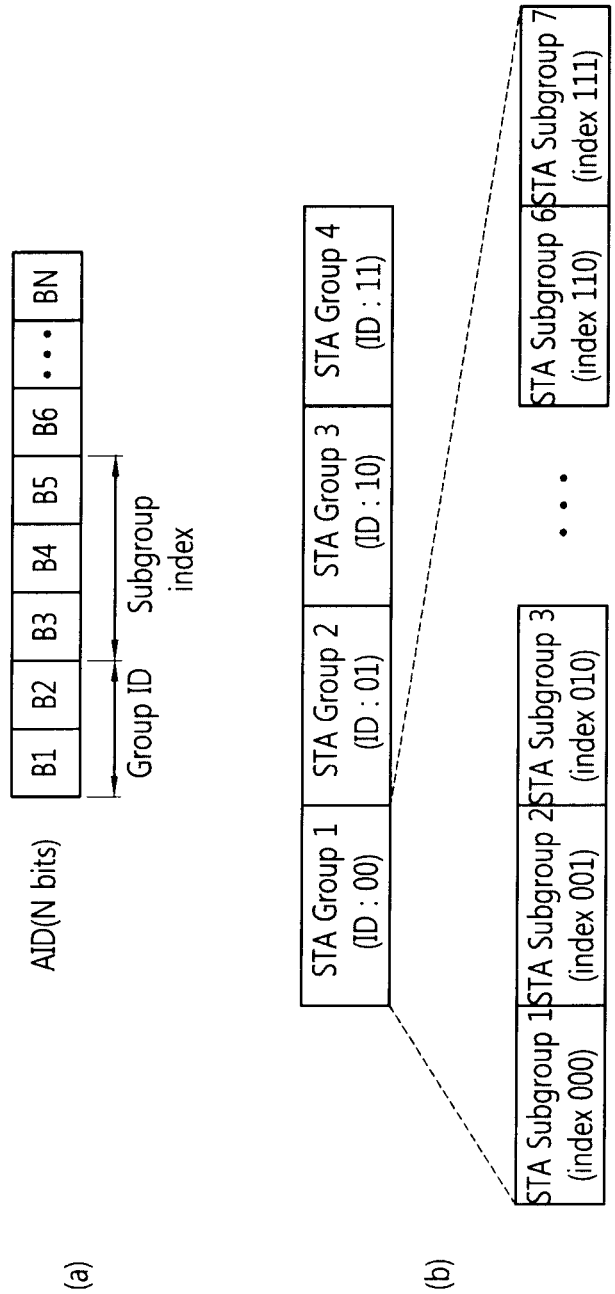
FIG. 11 is a diagram illustrating another example of STA grouping according to the embodiment of the present invention.

FIG. 11 is a diagram illustrating another example of STA grouping according to the embodiment of the present invention.

Referring to subfigure (a) of FIG. 11, first two B1 and B2 in an AID bit sequence may be set to indicate a group ID of an STA, and next three bits B3, B4, and B5 may be set to indicate a sub-group index of an STA.

In an example of STA grouping in subfigure (b) of FIG. 11, since a group ID is implemented with 2 bits, total 4 group IDs may be implemented, and all STAs may be grouped as total 4 groups. Since a sub-group index is implemented with 3 bits, total 8 sub-group indexes may be implemented, and STAs included in a specific STA group may be grouped as total 8 STA sub-groups.

As shown in FIG. 11, when the STA grouping is performed, a specific STA group may be indicated, and a specific sub-group belonging to a specific STA may be indicated based on a group ID and a sub-group index.

In addition, at least one STA sub-group may be indicated based on a group ID, sub-group off and a sub-group length. The sub-group offset indicates an STA sub-group having the smallest sub-group index in at least one STA sub-group among a plurality of STA sub-groups of an STA group indicated by a group ID. The sub-group length indicates the number of STAs of a continuous index including an STA sub-group indicated by the sub-group offset. For example, when grouping is performed as illustrated in FIG. 11(b), STA sub-groups 3 to 5 of an STA group 1 may be indicated through a group ID 1 (00), sub-group offset 3 (010), and a sub-group length 3.

Meanwhile, the number of bits in FIG. 11 is illustrative purpose only and a group ID and a sub-group index may be implemented through bits having various lengths. A range of the present invention may include an example of a simple variation of the number of bits.

If the STA is grouped, STAs may access a channel at different time intervals according a group ID and/or a sub-group index. When the STAs operate in a power save mode, the STAs enter an awake state at a channel access period for the STAs to access the channel. If the channel access period is terminated, the STAs may enter a sleep state. Accordingly, a problem associated with an over load due to an increased TIM size which may be caused by a large number of STAs and a channel access problem may be solved, and data may be efficiently transceived. Further, an efficiency of the power save mode may be increased. An example of a channel access according to the STA group is illustrated in FIG. 12.

Figure 12:
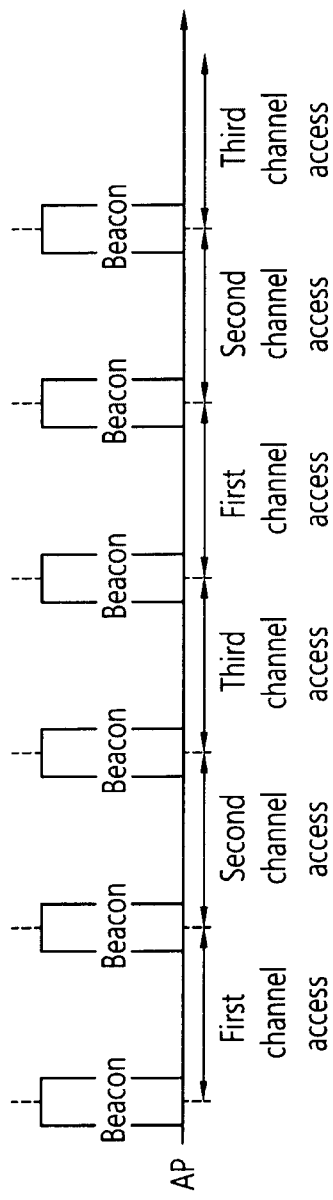
FIG. 12 is a diagram illustrating an example of an STA grouping-based channel access method according to an embodiment of the present invention.

FIG. 12 is a diagram illustrating an example of an STA grouping-based channel access method according to an embodiment of the present invention.

FIG. 12 illustrates an example of a channel access method of differently setting a channel access interval by STA groups.

Referring FIG. 12, when entire STAs are grouped as three STA groups, a channel access mechanism according to a beacon interval is shown.

A first beacon interval is a first channel access period for an STA group 1 according to a group ID 1. Accordingly, a beacon frame of the first beacon period may include a channel access information element indicating that STAs included in an STA group indicated by a group ID 1 may approach a channel. The STAs may determine whether the STAs may access a channel during a corresponding period through the channel access information element. Further, a beacon frame may include a TIM element for STAs included in a corresponding STA group. The TIM element may include bitmap information implemented to indicate whether there is a frame buffered through AIDs associated with a corresponding STA group. Accordingly, STAs included in an STA group 1 may access a channel to transceive data with the AP during a first channel access period.

A second beacon period is a second channel access period for an STA group 2 according to a group ID 2. Accordingly, a beacon frame of the second beacon period may include a channel access information element indicating that STAs included in an STA group indicated by a group ID 2 may approach the channel. The STAs may determine whether the STAs may access a channel during a corresponding period through the channel access information element. Further, a beacon frame may include a TIM element for STAs included in a corresponding STA group. The TIM element may include bitmap information implemented to indicate whether there is a frame buffered through AIDs associated with a corresponding STA group. Accordingly, STAs included in an STA group 2 may access a channel to transceive the data with the AP during a second channel access period.

A third beacon period is a third channel access period for an STA group 3 according to a group ID 3. Operation of STAs in a corresponding period may be performed as described above.

A fourth beacon interval is a second channel access period for an STA group 1 according to a group ID 1. A fifth beacon interval is a second channel access period for an STA group 2 according to a group ID 2. A sixth beacon interval is a third channel access period for an STA group 3 according to a group ID 2. That is, when entire STAs are grouped as three STA groups, channel access periods for three STA groups may be periodically repeated and formed.

In the channel access method as illustrated in FIG. 12, STAs of a different STA group may approach the channel every channel access period. Accordingly, the AP may generate bitmap information capable of indicating whether there is a buffered frame with respect to an STA group capable of accessing at a corresponding channel access period in order to generate a TIM element. Referring to FIGS. 9 to 11, since a specific STA group is a set of STAs to which an AID in a specific AID range is assigned, the size of bitmap information is reduced together with offset information and the bit information may configure efficient information capable of indicating presence of a buffered frame. That is, in the STA grouping-based channel access method, when the number of STAs are very large so that the number of assigned AIDs is more than that of existing AIDs, since grouping of the STA may be performed based on the AID, an efficient TIM element may be generated. Accordingly, data may be efficiently transceived based on a TIM protocol.

Meanwhile, although STA group of one step is performed in such a way that one STA group accesses during each beacon interval in an example of a channel access method shown in FIG. 12, the present invention suggest various channel access schemes. A channel access scheme according to the embodiment of the present invention may further assign a channel access period for a STA sub-group according to a grouping step of an STA. Each channel access period may be assigned to at least one STA group and/or at least one STA sub-group during one beacon interval. The channel access method according to the present will be described in detail later.

The AP may indicate an AID of an STA through AID fields of an association response frame and/or a reassociation response frame in order to assign an AID of the STA. Meanwhile, if the STA is grouped based on the AID, the AP may assign the AID to the STA and provide grouping related information. When the STA is grouped through one step, the AP may report the AID and a group ID to the STA. When the STA is grouped through at least two steps, the AP may provide detailed grouping related ID information as well as an AID, a group ID, and a sub-group index. In order to report grouping related information to the STA, a group assignment information element may be defined, and the group assignment information element may be included in an association response frame and/or a reassociation response frame to be transmitted.

Figure 13:
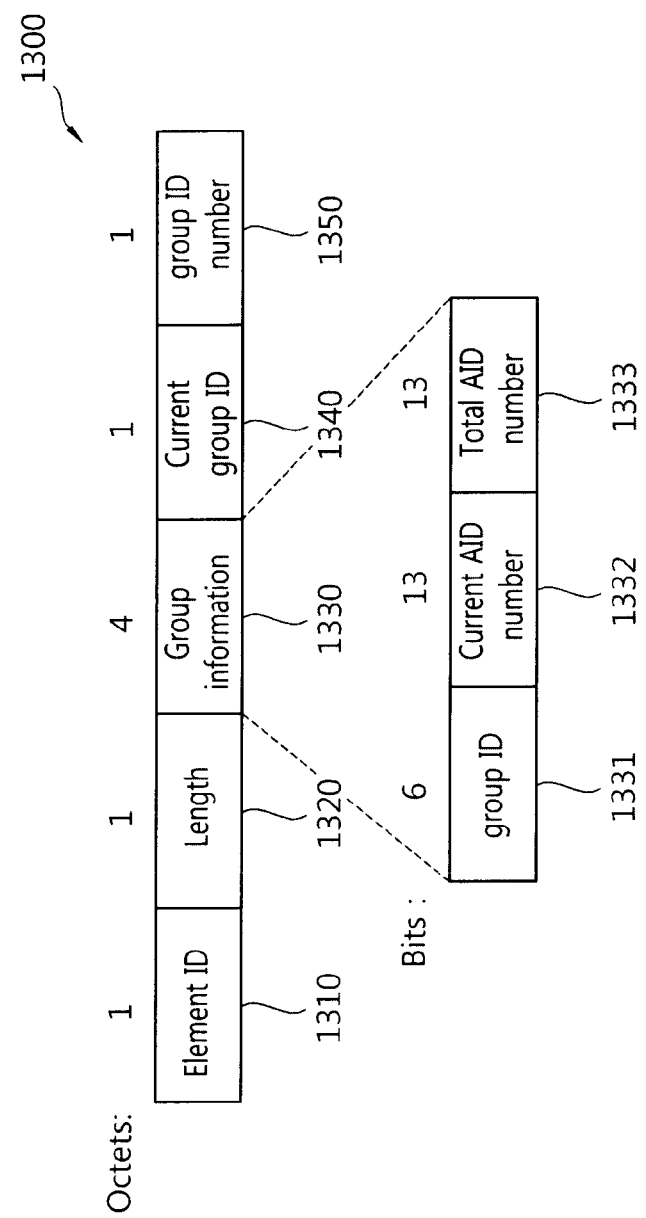
FIG. 13 is a block diagram illustrating an example of a group assignment information element format according to an embodiment of the present invention.

FIG. 13 is a block diagram illustrating an example of a group assignment information element format according to an embodiment of the present invention.

Referring to FIG. 13, the group assignment information element 1300 includes an element ID field 1310, a length field 1320, a group information field 1330, a Current Group ID field 1340, and a Number of Group ID field 1350.

The element ID field 1310 may set to indicate that a corresponding information element is a group assignment information element 1200.

The length field 1320 may be set to indicate a total length of a bit sequence configuring other fields included in the group assignment information element 1300 after the length field 1320.

The group information field 1330 includes grouping information for an STA for receiving the group assignment information element. The group information field 1330 may include a group ID sub-field 1331, a Current Number of AID sub-field 1332, and a Total Number of AID sub-field 1333.

The group ID sub-field 1331 may be set to indicate a group ID to identify an STA group including an STA.

The Current Number of AID sub-field 1332 may indicate the number of AIDs included in an STA group according to the group ID indicated by the group ID sub-field 1331, and may indicate the number of STAs included in an STA group according to the group ID.

The Total Number of AID sub-field 1333 may indicate the Total number of AIDs which may be included in an STA group according to the group ID indicated by the group ID sub-field 1331. The Total Number of AID sub-field 1333 may indicate the total number of STAs which may be included in an STA group according to a group ID.

The Current Group ID field 1340 may indicate a group ID of an STA group in which a channel access is allowed when corresponding information is transferred to the STA.

The Number of Group ID field 1350 may indicate the total number of STA groups.

In a channel access method of assigning a channel access period for an STA group according to a specific group ID by beacon intervals, the STA may determine a channel access period for an STA group to which the STA belongs through the Current Group ID field 1340 and the Number of Group ID field 1350. Accordingly, the STA may receive a beacon frame according to a corresponding channel access period to receive a buffered frame from an AP when there is a frame buffered through a TIM element, and may transceive the data with the AP during a corresponding channel access period.

Meanwhile, the AID may be assigned to the STA according to a device type of the STA. One AID in a specific AID range may be assigned to the STA of a specific device type. When STA group is performed based on the AID, the STA grouping may be performed according to a device type.

For example, two STA groups are set and accordingly AIDs may be divided into two groups. An AID belonging to a first STA group may be assigned to an STA to be used for over load. An AID belonging to a second STA group may be assigned to an STA to be used for sensor/meter.

Meanwhile, required device characteristics may be changed according to a device type. As one example of the characteristics, so as to reduce power consumption according to a device type, a maximum transmission power limit value may be differently set. Accordingly, a group of the STA is assigned, information to indicate a maximum transmission power value may be provided. This may be performed by FIG. 4 and providing a group assignment information element.

Figure 14:
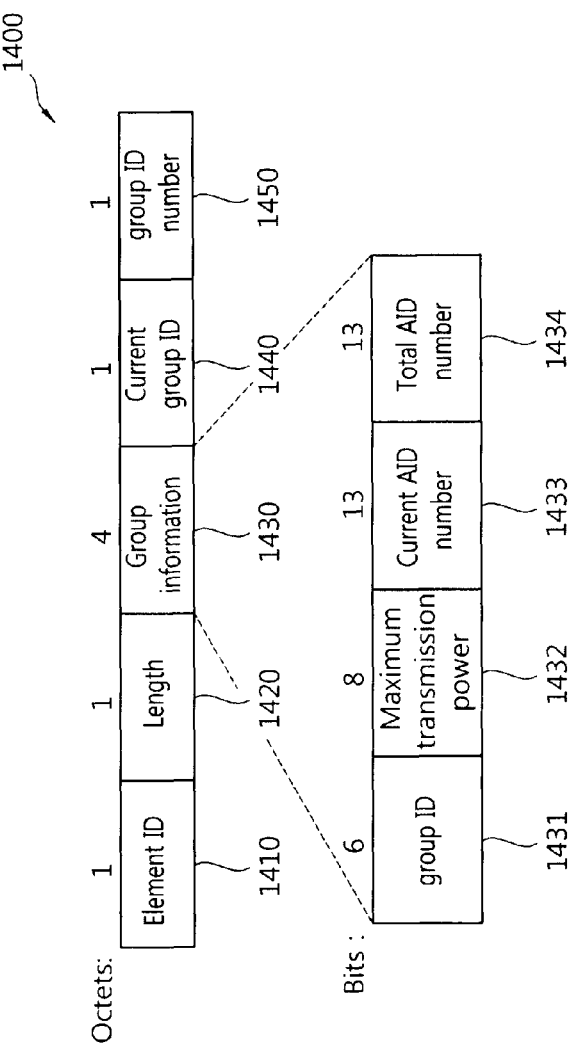
FIG. 14 is a block diagram illustrating another example of a group assignment information element format according to an embodiment of the present invention.

FIG. 14 is a block diagram illustrating another example of a group assignment information element format according to an embodiment of the present invention.

Referring to FIG. 14, the group assignment information element 1400 includes an element ID field 1410, a length field 1420, a group information field 1430, a current group ID field 1440, and a number of group ID field 1450. However, the element ID field 1410, since the length field 1420, the group information field 1430, the current group ID field 1440, and the number of group ID field 1450 of the group assignment information element 1400 are the same as the element ID field 1310, the length field 1320, the group information field 1330, the current group ID field 1340, and the number of group ID field 1350 of the group assignment information element 1330 of FIG. 13, respectively, a detailed description thereof is omitted.

The group information field 1430 of the group assignment information element 1400 includes a group ID sub-field 1431, a maximum transmission power sub-field 1432, a current number of AID sub-field 1433, and a total number of AID sub-field 1434. Since the group ID sub-field 1431, the Current Number of AID sub-field 1433, and the Total Number of AID sub-field 1434 are the same as the group ID sub-field 1331, the Current Number of AID sub-field 1332, and the Total Number of AID sub-field 1333 shown in FIG. 13, respectively, a detailed description thereof is omitted.

The maximum transmission power sub-field 1432 may indicate a limitation value of maximum transmission power which an STA group according to a group ID indicated by a group ID sub-field 1431 can use. A specific AID included in a specific AID range may be assigned to an STA of a specific device type and may be included in an STA group with limited maximum transmission power. Further, data transception with the AP may be performed during a channel access period using transmission power within a limitation value indicated by the maximum transmission power sub-field 1432.

When the STA belongs to a specific STA group and receives assignment of an AID within a range of an AID assigned to STAs of a corresponding STA group, as a traffic characteristic varies, variation in the group is needed. An amount of a battery remaining in the STA is reduced so that a desire duty cycle may be changed. For example, an inactive duration of a current duty cycle is 1 second, but a remaining amount of the battery is very small so that it is necessary to increase the inactive duration to 10 seconds.

In the above case, the STA may request to change an STA group to which the STA belongs by transmitting an AID assignment request frame to the AP. When the STA requests to change to a new group, the AID assignment request frame may include corrected device type related information and/or corrected duty cycle related information.

The AP may assign a new AID and a new STA group through the AID assignment response frame. The new STA group may be assigned by reassigning an AID value. As described above, time information indicated by an active duration time of a corresponding STA group may include a reassigned AID value and an AID assignment response frame.

When STAs are grouped as an STA group, the STAs may be grouped according to an application characteristic in addition to a device type and/or a duty cycle. For example, terminals belonging to the same multi-cast group are grouped and managed as the same group. If an STA1 and an STA2 want to receive a multi-cast frame of a multi-cast address M1, the AP groups the STA1 and the STA2 as the same group. In this case, the STA1 and the STA2 may awake at the same time point to receive a beacon frame and may know that there is a multi-cast frame to receive the AP through a TIM element. Next, the STA1 and the STA2 receive corresponding multi-cast frames from the AP.

When the STA1 and the STA2 are not grouped as the same group, the AP may transmit the multi-cast frame at a DTIM interval representing each group many times. That is, the multi-cast frame may be repeatedly transmitted at a DTIM interval of a group to which the STA1 belongs and at a DTIM interval of a group to which the STA2 belongs, respectively.

In the present invention, the STA may transmit the AID assignment request frame in such a way that the group is managed according to application characteristics of STAs. In this case, a corresponding STA may add a multi-cast address for reception to the AID assignment request frame. In this case, the STA may add a delivery interval of a corresponding multi-cast frame to an AID assignment request frame. When receiving an AID assignment request frame including the multi-cast address from the STA, the AP may generate a group for transferring the multi-cast frame of a corresponding multi-cast address, and may reassign and transfer an AID value belonging to a corresponding group to the STA. A response of the AP may be achieved by transmitting the AID assignment response frame.

Another example of performing STA grouping according to the application characteristic includes direction communication between STAs. In order to easily perform the direct communication between terminals, peer STAs should awake at the same time point. For the purpose, two peer STAs belong to the same group.

When the STA wants to perform direct communication with a specific STA, the STA may transmit an AID assignment request frame before DLS setup (including a case of a TDLS). In this case, the STA may add an MAC address of a peer STA being a target of the DLS setup to the AID assignment request frame. The AP responds the AID assignment response frame to a terminal transmitting the AID assignment request frame by assigning an AID to be belonged to the same group as that of the peer STA.

If the two peer STAs belong to the same group, the STA may know when the peer STA receives a beacon frame. Accordingly, after the DLS setup is established, an STA having a frame to be sent to an STA of the other party among peer STAs in a power save mode transmits a peer traffic indication frame before receiving the beacon frame to the AP. If the peer STA receives a traffic indication frame, the peer STA may know that there is a frame capable of receiving by the peer STA through direct communication. Accordingly, the peer STA may receive a buffered frame from the terminal transmitting the peer traffic indication frame.

If the STA transmitting the peer traffic indication frame cannot know when the peer STA receives the beacon frame, since the STA should continuously awake for a very long time, power may be unnecessarily consumed.

An AID assignment request frame format and an AID assignment response frame for requesting a new AID and/or requesting a new STA group will be described with reference to FIGS. 15 and 16.

Figure 15:
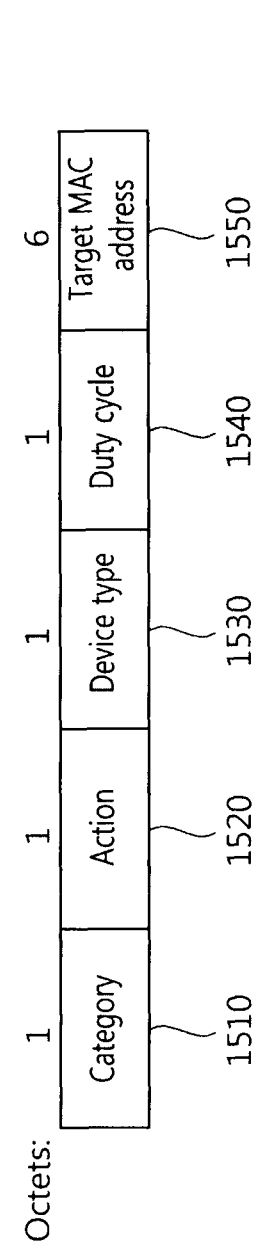
FIG. 15 is a block diagram illustrating an example of an AID assignment request frame format according to an embodiment of the present invention.

FIG. 15 is a block diagram illustrating an example of an AID assignment request frame format according to an embodiment of the present invention.

Referring to FIG. 15, an AID assignment request frame 1500 includes a category field 1510, an action field 1520, a device type field 1530, a duty cycle field 1540, and a target MAC address field 1550.

The category field 1510 and the action field 1520 may be set to indicate that a corresponding frame is an AID assignment request frame.

The device type field 1530 may include device type related information of the STA transmitting the AID assignment request frame 1500.

The duty cycle field 1540 may include sleep interval and/or inactive duration time related information.

The target MAC address field 1550 may be set to indicate a multi-cast group address and/or a DLS peer STA address when the STA requests to be STA grouped based on the application characteristic. If the multi-cast group address is included in the target MAC address field 1550, an AID may be assigned to a corresponding STA so that the STA belongs to an STA group to which a corresponding multi-cast frame is transferred. When the DLS peer STA address is included in the target MAC address field 1550, the AID may be assigned to the STA so that a corresponding peer STA belongs to the same STA group.

Figure 16:
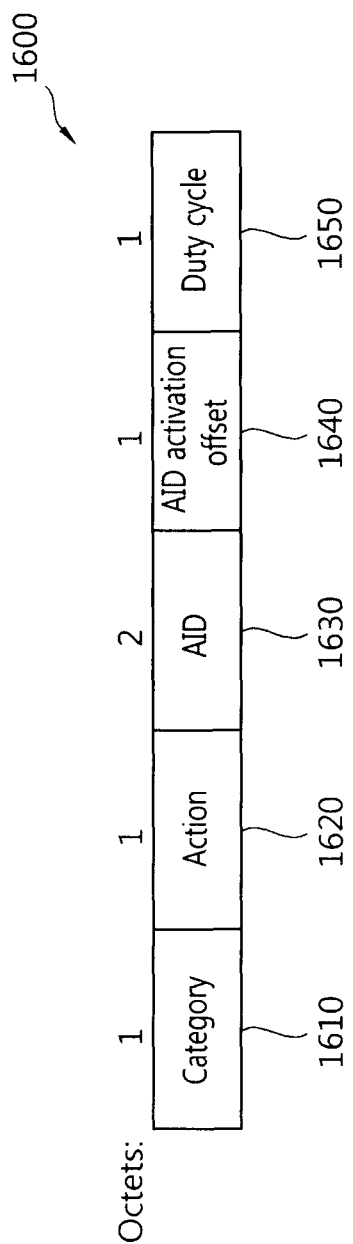
FIG. 16 is a block diagram illustrating an example of an AID assignment response frame format according to an embodiment of the present invention.

FIG. 16 is a block diagram illustrating an example of an AID assignment response frame format according to an embodiment of the present invention.

Referring to FIG. 16, an AID assignment response frame 1600 includes a category field 1610, an action field 1620, an AID field 1630, an AID activation offset field 1640, and a duty cycle filed 1650.

The category field 1610 and the action field 1620 may be set to indicate that a corresponding frame is an AID assignment request frame.

The AID field 1630 may indicate an AID to be newly assigned to an STA that requests the assignment of the AID.

The AID activation offset field 1640 may indicate a time offset when the STA activates the AID indicated by the AID field 1630. The offset may be expressed as a beacon interval, a DTIM beacon interval, and a time unit (TU).

The duty cycle filed 1650 is a duty cycle of an STA group to which the newly assigned AID and the AID belong, and may include a sleep interval or an inactivation duration time.

The AP does not receive the AID assignment request frame, and may transmit the AID assignment response frame. Such an operation may be called an unsolicited AID assignment response. The AP may perform the unsolicited AID assignment response for the purpose of reducing a bitmap size for a TIM or of increasing a duty cycle of a specific STA representing an abnormal operation.

Meanwhile, information included in AID assignment request frame and AID assignment response frame using frames of the formats shown in FIGS. 15 and 16 may be exchanged between the STA and the AP in order to change an AID to which the STA is assigned and during an association procedure between the STA and the AP. In this case, the above information may be implemented by an AID assignment request information element and an AID assignment response information element. The AID assignment request information element is included in an association request frame transmitted from the STA so that the association request frame may be transmitted. The AID assignment response information element is included in an association response frame transmitted from the STA so that the association response frame may be transmitted. The AID assignment request information element may be implemented to include the device type field 1530, the duty cycle field 1540, and the target MAC address field 1550 of the AID assignment request frame shown in FIG. 15. Further, the AID assignment response information element may be implemented to include the AID field 1630, the AID activation offset field 1640, and the duty cycle filed 1650 of the AID assignment response frame shown in FIG. 16. The AP may receive an association request frame from the STA, may generate the AID assignment response information element based on information included in the AID assignment information element, and may add the generated AID assignment response information element to an association response frame to transmit the association response frame to the STA.

The AID assigned to the STA may be reassigned and changed due to various reasons as well as the foregoing parts. The AID may be changed to an AID belonging to the same STA group or an AID belonging to another STA group. First, an AID of some STA may be changed to an AID according to the same STA as an existing assigned STA group. As described above, in order to reduce a length of the TIM element, when compressing a bitmap size for the TIM, if AIDs assigned to STAs are similar to each other, the bitmap size may be efficiently compressed. For the purpose, an AID of the STA may be reassigned to another ID in the same STA group. In this case, the AP may transmit an AID assignment frame with same group ID to the STA.

Figure 17:
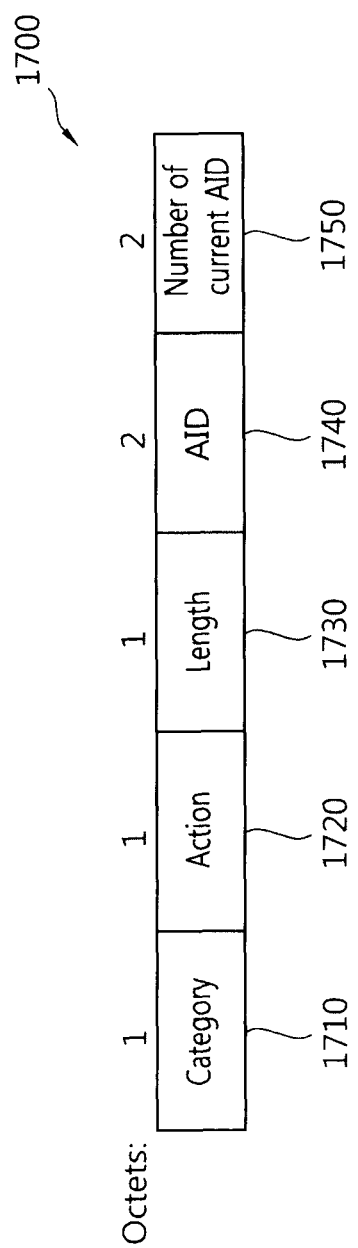
FIG. 17 is a block diagram illustrating an example of an AID assignment frame format with same group ID according to an embodiment of the present invention.

FIG. 17 is a block diagram illustrating an example of an AID assignment frame format with same group ID according to an embodiment of the present invention.

Referring to FIG. 17, the AID assignment frame with same group ID 1700 includes a category field 1710, an action field 1720, a length field 1730, an AID field 1740, and a number of current AID field 1750.

The category field 1710 and the action field 1720 may be set to indicate that a corresponding frame is the AID assignment frame with same group ID.

The length field 1730 may indicate a length of a bit sequence configuring fields after the length field 1730 in the AID assignment frame with same group ID 1730.

The AID field 1740 may be set to indicate an AID to be newly assigned.

The number of current AID field 1750 may indicate the number of assigned AIDs included in an STA group with an AID, which may be interpreted as the number of current STAs configuring an STA group with the STA due to AID assignment.

The AP may report a new AID to the STA by transmitting the AID assignment frame with same group ID 1700 to the STA at a necessary time point. The STA receiving the AID assignment frame with same group ID 1700.

There may be a need to an associated AID to an STA group different from the STA group according to a currently assigned AID. For example, when an STA group to which an AID assigned to the STA is saturated so that channel access is difficult, the STA may request assignment of an AID associated with another STA group to the AP. In this case, the STA may request AID assignment according to an STA group of a different group ID by transmitting an AID assignment request frame to the AP. The AP may assign an AID to the STA by transmitting the AID assignment with different group ID frame. Meanwhile, the AP may assign the AID to the STA by transmitting the AID assignment with different group ID frame without a request from the STA. An AID assignment request frame format and the AID assignment with different group ID frame format will be described with reference to FIGS. 18 and 19.

Figure 18:
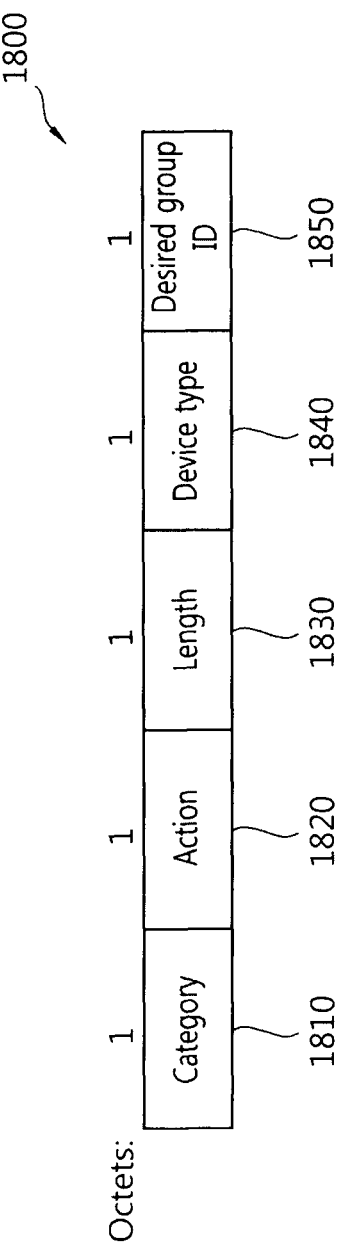
FIG. 18 is a block diagram illustrating an example of an AID assignment request frame format according to an embodiment of the present invention.

FIG. 18 is a block diagram illustrating an example of an AID assignment request frame format according to an embodiment of the present invention.

Referring to FIG. 18, the AID assignment request frame 1800 includes a category field 1810, an action field 1820, a length field 1830, a device type field 1840, and a desired group ID field 1850.

The category field 1810 and the action field 1820 may be set to indicate that a corresponding frame is the AID assignment request frame 1800.

The length field 1830 may indicate a length of a bit sequence configuring fields included after the length field 1830 in the AID assignment request frame 1800.

The device type field 1840 may include information on a device type of an STA transmitting the device type field 1840.

When there is a group ID to be reassigned to the STA, the desired group ID field 1850 may be set to indicate a corresponding group ID.

The AP receives a new AID based on the foregoing information.

Figure 19:
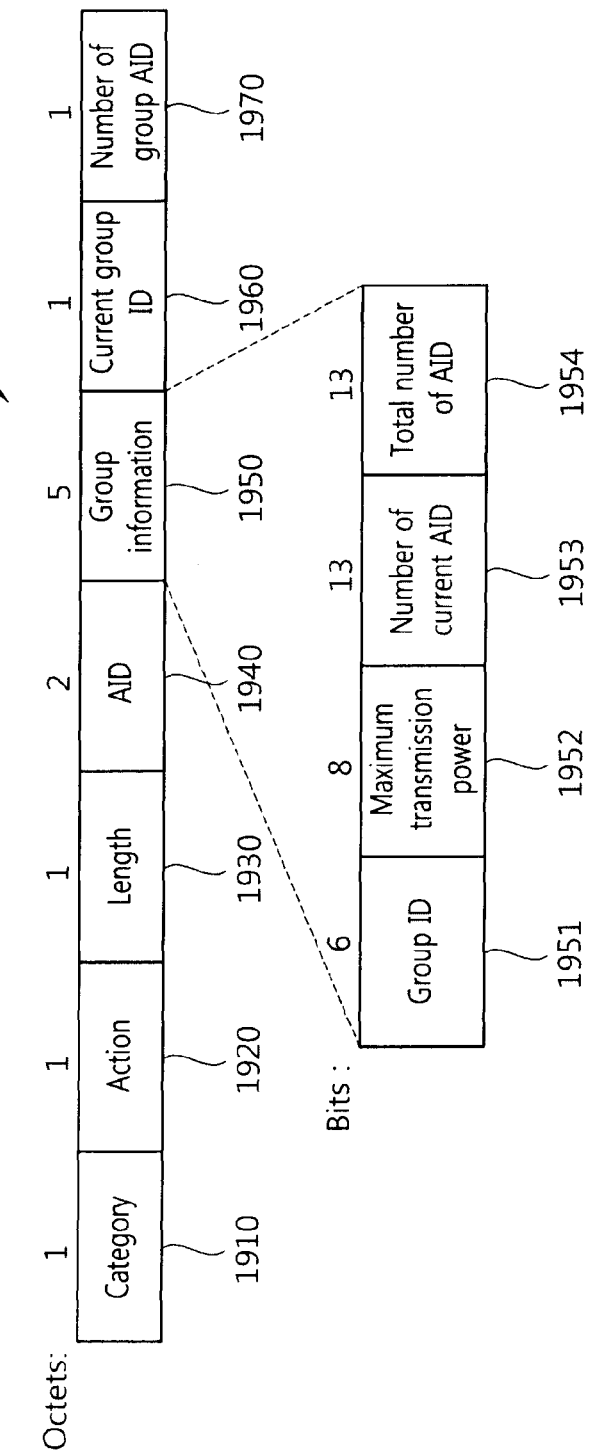
FIG. 19 is a block diagram illustrating an AID assignment with different group ID frame format according to an embodiment of the present invention.

FIG. 19 is a block diagram illustrating an AID assignment with different group ID frame format according to an embodiment of the present invention.

Referring to FIG. 19, an AID assignment with different group ID frame 1900 includes a category field 1910, an action field 1920, a length field 1930, an AID field 1940, a group information field 1950, a current group ID field 1960, and a number of group AID field 1970.

The category field 1910 and the action field 1920 may be set to indicate that a corresponding frame is the AID assignment with different group ID frame 1900.

The length field 1930 may indicate a length of a bit sequence configuring fields included after the length field 1930 in the AID assignment with different group ID frame 1900.

The AID field 1940 may be set to indicate an AID to be assigned to the ATA by the AP.

The group information field 1950 includes grouping information for an STA to receive a group assignment information element. The group information field 1950 may include a group ID sub-field 1951, a maximum transmission power sub-field 1952, a number of current AID sub-field 1953, and a total number of AID sub-field 1954.

The group ID sub-field 1951 may be set to indicate a group ID to identify an STA group with an STA.

The maximum transmission power sub-field 1952 may indicate a limitation value of maximum transmission power available by STAs included in an STA group according to a group ID indicated by the group ID sub-field 1951.

The number of current AID sub-field 1953 may indicate the number of AIDs included in an STA group according to the group ID indicated by the group ID sub-field 1951, which may indicate the number of STAs included in the STA group according to the group ID.

The total number of AID sub-field 1954 may indicate the total number of AIDs which may be included in an STA group according to the group ID indicated by the group ID sub-field 1951. That is, the total number of AID sub-field 1954 may indicate the total number of STAs which may be included in the STA group according to a group ID.

The current group ID field 1960 may indicates a group ID of an STA group in which channel access is allowed at a time point when corresponding information is transferred to the STA.

The number of group AID field 1970 may indicate the total number of STA groups.

Although the channel access method is described with reference to FIG. 12, various channel access method based on STA grouping will be now described.

Figure 20:
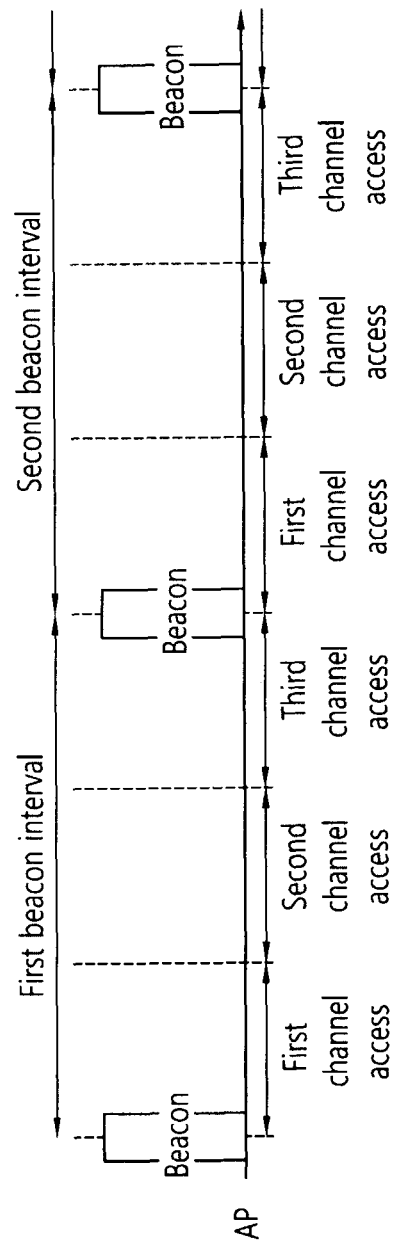
FIG. 20 is a diagram illustrating an example of a channel access method according to an embodiment of the present invention.

FIG. 20 is a diagram illustrating an example of a channel access method according to an embodiment of the present invention.

Referring to FIG. 20, one beacon interval may include three channel access periods. Each channel access period may be set for each STA. According to the embodiment, STAs belonging to an STA group 1 during a first beacon interval access a channel during a first channel access period to transceive the data with the AP. Next, STAs belonging to an STA group 2 access a channel during a second channel access period to transceive the data with the AP, and STAs belonging to an STA group 3 access a channel during a third channel access period to transceive data with the AP. During a second beacon interval, a channel access period according to the first beacon interval may be repeated and formed.

In FIG. 20, channel access periods in one beacon interval are equally assigned by the total number of STA groups, and the channel access periods are sequentially assigned in the order of the STA groups. Accordingly, although special information is not included in a beacon frame, an STA knowing the total number of STA groups and an STA group to which the STA belongs may recognize when starts and terminates a channel access period.

Meanwhile, unlike FIG. 20, a channel access period is not equally assigned to each STA group in one beacon interval, and an assignment order of the channel access period may be assigned regardless of the order of the STA groups. The channel access method may be performed with reference to FIG. 21.

Figure 21:
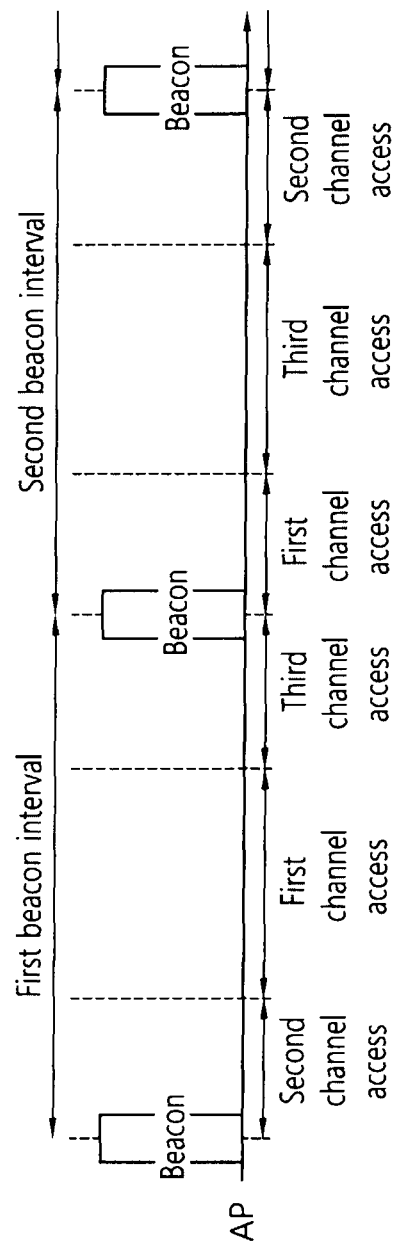
FIG. 21 is a diagram illustrating another example of a channel access method according to an embodiment of the present invention.

FIG. 21 is a diagram illustrating another example of a channel access method according to an embodiment of the present invention.

Referring to FIG. 21, it may be understood that a plurality of channel access periods are assigned in one beacon interval, and lengths of respective access periods are set differently from each other. In this case, an STA additionally needs information on a corresponding channel access period to access a channel according to a channel access period for an STA group to which the STA belongs. To this end, the beacon frame may include a channel access information element.

Figure 22:
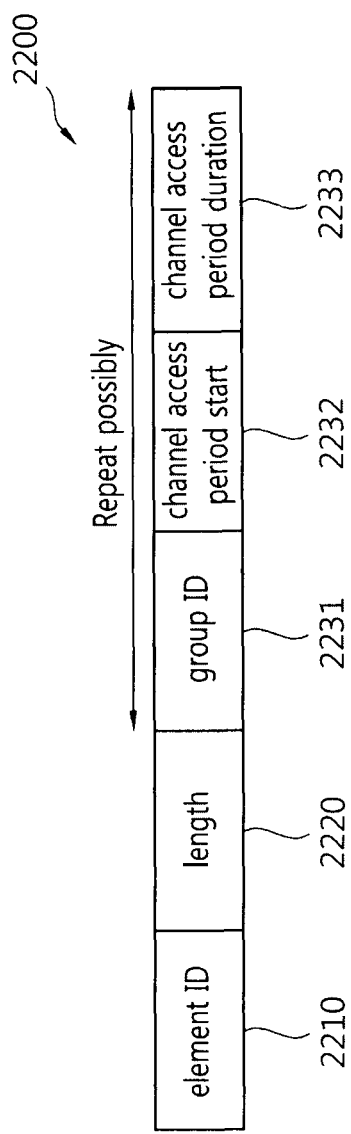
FIG. 22 is a block diagram illustrating an example of a channel access information element format.

FIG. 22 is a block diagram illustrating an example of a channel access information element format.

Referring to FIG. 22, the channel access information element 2200 includes an element ID field 2210, a length field 2220, a group ID field 2231, a channel access period start field 2232, and a channel access period duration field 2233.

The element ID field 2210 may be set to indicate that a corresponding information element is a channel access information element 2200.

The length field 2220 may be set to indicate a total length of a bit sequence configuring fields included after the length field 2220 in the channel access information element 2200.

The group ID field 2231, the channel access period start field 2232, and the channel access period duration field 2233 implement information on a channel access period with respect to a specific STA group.

The group ID field 2231 may include a group ID associated with an STA group capable of accessing a channel during a channel access period specified by the channel access period start field 2232 and the channel access period duration field 2233.

The channel access period start field 2232 indicates a time point when a channel access period for an STA group indicated by the group ID field 2231 starts. A value indicated by the channel access period start field 2232 may indicate a time interval to a start time point based on a beacon frame transmission time point when the channel access information element 2200 is included and transmitted.

The channel access period duration field 2233 may be set to indicate a duration time of a channel access period for an STA group indicted by the group ID field 2231.

Meanwhile, The group ID field 2231, the channel access period start field 2232, and the channel access period duration field 2233 may be repeatedly included by the number of channel access periods assigned in a beacon interval associated with a beacon frame to which the channel access information element 2200 is included and transmitted. Accordingly, when the STA interprets the channel access information element 2200 of the beacon frame, the STA may know how many fields of a channel access period are repeated in a corresponding information element through a value of the length field 2220.

Referring back to FIG. 21, a first beacon interval and a second beacon interval include three channel access periods, respectively. Accordingly, a channel access period information element with information on a channel access period in the first beacon interval and a channel access period information element with information on a channel access period in the second beacon interval may include fields for a first channel access period, fields for a second channel access period, and fields for a third channel access period.

STAs may determine a period when the STAs may approach a channel based on a channel access period information element of a beacon frame. Each STA may access the channel at a channel access period for each STA to exchange data with the AP. When a current period is a channel access period for an STA operating in a power save mode, the STA operates in a sleep state. If the channel access period for the STA starts, the STA may enter an awake state to operate.

Meanwhile, in the STA grouping-based channel access method, all STAs may access a channel during a corresponding period by setting a specific period being all channel access period and may be set to exchange data with the AP. Only specific STAs which are not associated with the AP during the specific period being all channel access period may be implemented to transmit a frame to the AP through a channel access.

Figure 23:
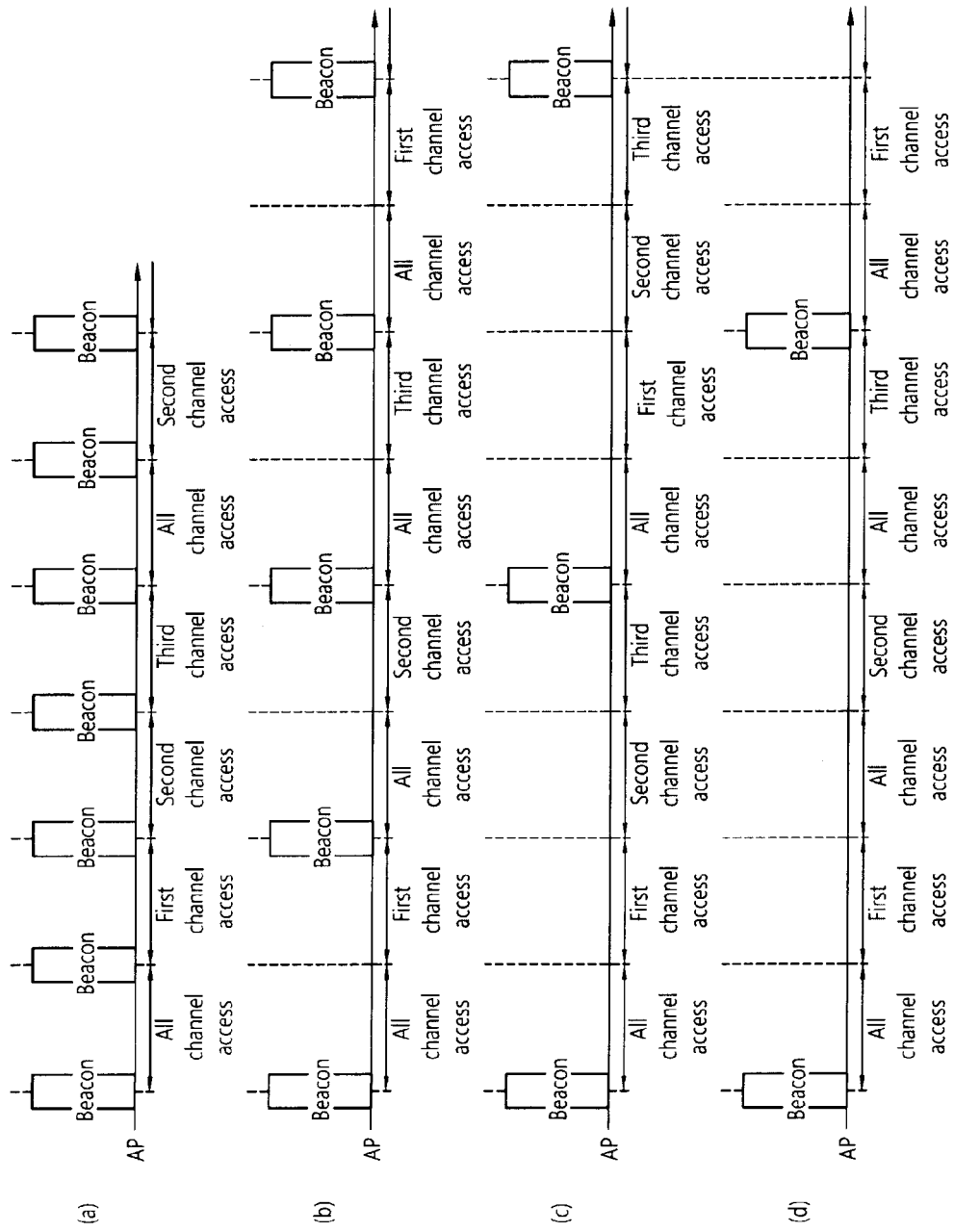
FIG. 23 is a diagram illustrating an example of a channel access method according to an embodiment of the present invention.

When all channel access period is set, the channel access method may be performed as illustrated in FIG. 23.

FIG. 23 is a diagram illustrating an example of a channel access method according to an embodiment of the present invention.

Referring to subfigure (a) of FIG. 23, a specific beacon interval may be set as all channel access period. The subfigure (a) may illustrate an example when all channel access period are added in a channel access method as illustrated in FIG. 12.

In a case of the subfigure (a), since a channel access period with respect to one STA group is set in a beacon interval, the beacon frame may be transmitted to include a TIM for a corresponding STA group. In this case, an operation of receiving a buffered frame based on the TIM may be performed during a channel access period for the STA group.

Referring to subfigure (b) of FIG. 23, all channel access period and a channel access period for a specific STA group may be assigned in the beacon interval. According to an example shown in the subfigure (b), it may be understood that duration times of all channel access period and a channel access period for a specific STA group are the same as each other, and all channel access period are set after transmission of the beacon frame. In this case, the STA may not clearly receive information on a channel access period set in a corresponding beacon interval but may distinguish the all channel access period from the channel access period for the specific STA group. This is because the STA know that channel access periods are sequentially set by STA groups and a channel access period for a specific STA group starts after half of the beacon interval. Accordingly, the STA may determine whether the STA has a channel access authority during a channel access period for a specific STA group to operate.

In a case of the subfigure (b), the all channel access period is disclosed before the channel access period for the specific STA group, which is illustrative purpose only. That is, a method where the all channel access period is disclosed after the channel access period for the specific STA group may be considered.

Referring to subfigure (c) of FIG. 23, the all channel access period and channel access periods for respective STA groups may be set in the beacon interval to have an equal duration time. Since the STA may know that the all channel access period and channel access periods for respective STA groups are sequentially set in the beacon interval, the STA may access the channel during a channel access period for an STA group to which the STA belongs to exchange data with the AP. Meanwhile, the all channel access period may be implemented according to setting so that all STAs may access the channel or an STA which is not associated with the AP may access the channel.

As shown, the all channel period is disclosed before channel access periods for respective STA groups, which is illustrative purpose only. That is, a method may be considered where the all channel period is disclosed after channel access periods for STA groups.

Referring to subfigure (d) of FIG. 23, the all channel access period of an STA group may be set in a beacon interval before channel access periods for respective STA groups.

In scheduling of various channel access periods shown in FIG. 23, since information on at least one channel access period assigned in a corresponding beacon interval is included in a transmission beacon frame to be transmitted from the AP, the information is transferred to the STA so that information on the channel access period may be shared between the AP and the STA. In this case, the information on the channel access period may be the above channel access information element. Signaling with respect to scheduling of a channel access period is previously achieved between the STA and the AP so that information on the channel access period may be shared.

According to the channel access method described with reference to the drawings, there has been suggested a method where channel access periods are set by STA groups and each STA accesses a channel according to a channel access period to exchange data with the AP. Meanwhile, as shown in FIG. 11, STAs may be grouped as STA sub-groups. In this case, the channel access period is set with respect to an STA group and/or an STA sub-group, and each STA accesses a channel according to a preset channel access period to exchange data with the AP.

Figure 24:
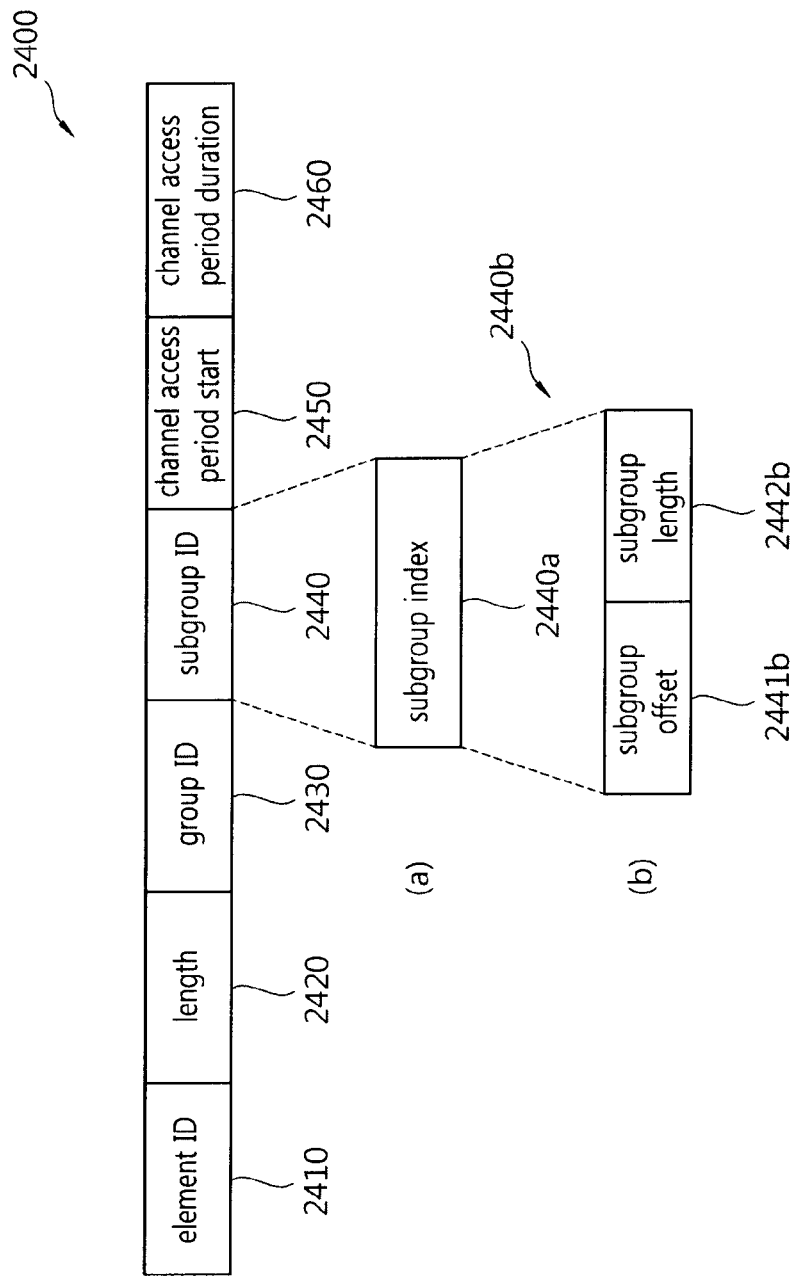
FIG. 24 is a block diagram illustrating another example of a channel access information element format according to an embodiment of the present invention.

FIG. 24 is a block diagram illustrating another example of a channel access information element format according to an embodiment of the present invention.

Referring to FIG. 24, the channel access period information element 2400 includes an element ID field 2410, a length field 2420, a group ID field 2430, a sub-group ID field 2440, a channel access period start field 2450, and a channel access period duration field 2460.

The element ID field 2410 may be set to indicate that a corresponding information element is a channel access information element 2400.

The length field 2420 may be set to indicate a total length of a bit sequence configuring fields included after the length field 2420 in the channel access information element 2400.

The group ID field 2430 and the sub-group ID field 2440 implement an STA group and/or at least one STA sub-group capable of accessing a channel during a channel access period specified by the channel access period start field 2450 and the channel access period duration field 2460.

When the channel access period is a channel access period for a specific STA group, the group ID field 2430 includes a group ID associated with a corresponding STA group, and the sub-group ID field 2440 may be set to indicate a value (e.g. Null value) which is not specified. In this case, the channel access period start field 2450 and the channel access period duration field 2460 specify a channel access period for a corresponding STA group.

When the channel access period is a channel access period for at least one STA sub-group, the group ID field 2430 may be set to include a group ID associated with an STA group with at least one STA sub-group. Meanwhile, the sub-group ID field 2440 may be implemented in two schemes.

Referring to subfigure (a), a sub-group ID field includes a sub-group index sub-field 1940a. The sub-group index sub-field 2440a may indicate a sub-group index associated with an STA sub-group capable of accessing the channel during a channel access period specified by the channel access period start field 2450 and the channel access period duration field 2460.

Referring to subfigure (b), a sub-group ID field 2440b includes a group offset sub-field 1941b and a sub-group length field 2442b. The group offset sub-field 2441b indicates an STA sub-group having the smallest sub-group index in at least one STA sub-group among a plurality of STA sub-groups of an STA group indicated by the group ID field 2430. The group offset sub-field 2442b indicates the number of STA sub-groups of continuous indexes including an STA sub-group indicated by the group offset sub-field 2441b. Accordingly, at least one STA sub-group may be indicated by the group ID field 2430, the group offset sub-field 1941b, and a sub-group length field 2442b.

The channel access period start field 2450 indicates a time point when a channel access period for at least one STA sub-group indicated by the group ID 2430 and the sub-group ID field 2440 starts. The channel access period duration field 2460 may be set to indicate a duration time of a channel access period for at least one STA sub-group indicated by the group ID 2430 and the sub-group ID field 2440.

Figure 25:
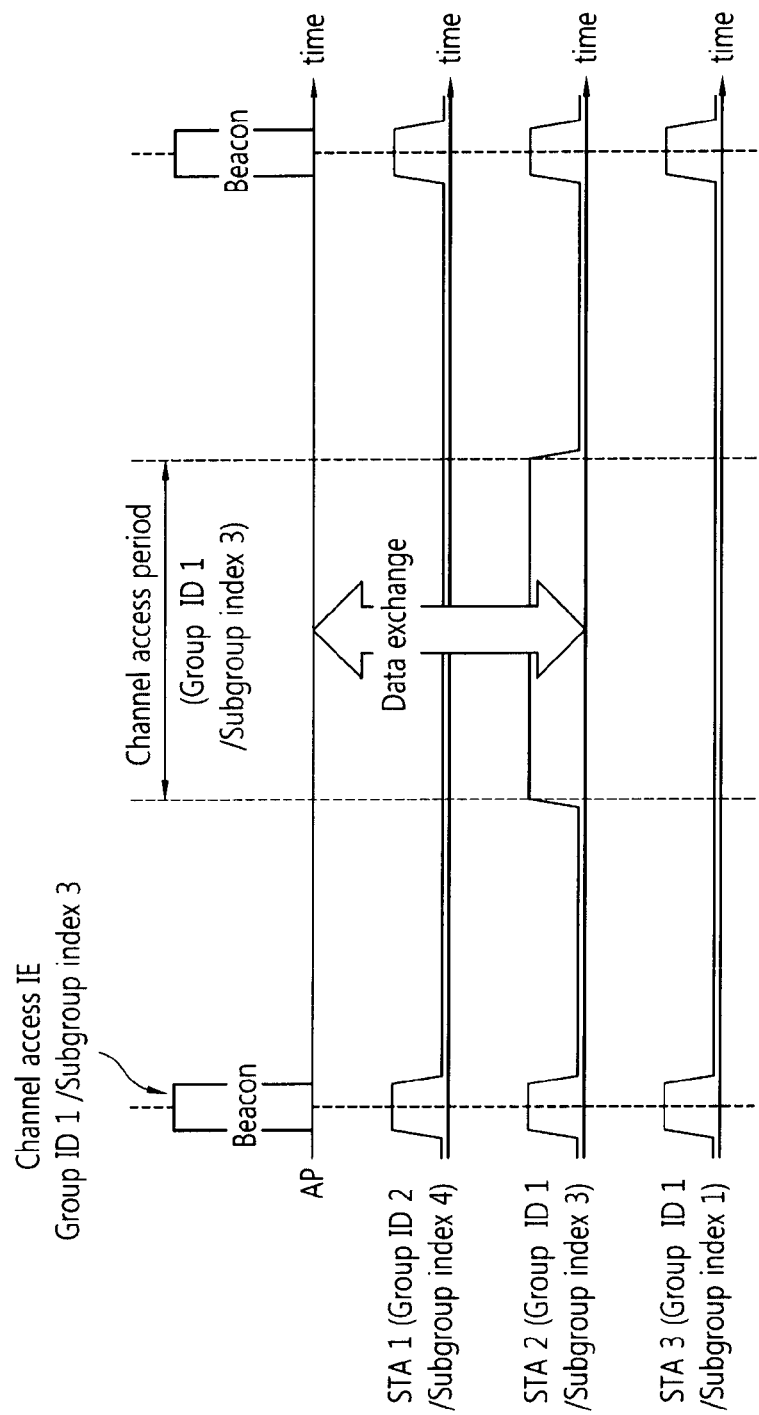
FIG. 25 is a diagram illustrating another example of a channel access method according to an embodiment of the present invention.

FIG. 25 is a diagram illustrating another example of a channel access method according to an embodiment of the present invention.

Referring to FIG. 25, an STA1 is included in an STA sub-group indicated by a group ID 2 and a sub-group index 4. An STA2 is included in an STA sub-group indicated by a group ID 1 and a sub-group index 3. An STA3 is included in an STA sub-group indicated by a group ID 1 and a sub-group index 1.

The STA1, the STA2, and the STA3 enters an awake state at a transmission time point of a beacon frame to receive the beacon frame and a channel access information element of a format as illustrated in FIG. 19 is included in the beacon frame so that the beacon frame is transmitted. The STA1 to STA3 acquire information on a channel access period through a channel access information element.

The STA1 to STA3 may determine whether a channel access period therefor starts through a group ID field and a sub-group ID field of the channel access information element.

Since the group ID field indicates a group ID 1, the STA 1 confirms that the information is not information on a channel access period for the STA1. Accordingly, the STA1 may maintain a sleep state to operate after reception of the beacon frame.

Since a group ID field indicates a group ID 1 and a sub-group ID field indicates a sub-group index 3, an STA2 may determine whether information on the channel access period is information for the STA2. Accordingly, the STA2 enters an awake state at a time point indicated by a channel access period start field to exchange data with the AP during a duration time indicated by the channel access period duration field. If the channel access period is terminated, the STA2 again enters a sleep state.

Since a group ID field indicates a group ID 1 but a sub-group ID field indicates a sub-group index 1, an STA3 confirms that the information is not information on a channel access period for the STA3. Accordingly, the STA3 may maintain a sleep state to operate after reception of the beacon frame.

Figure 26:
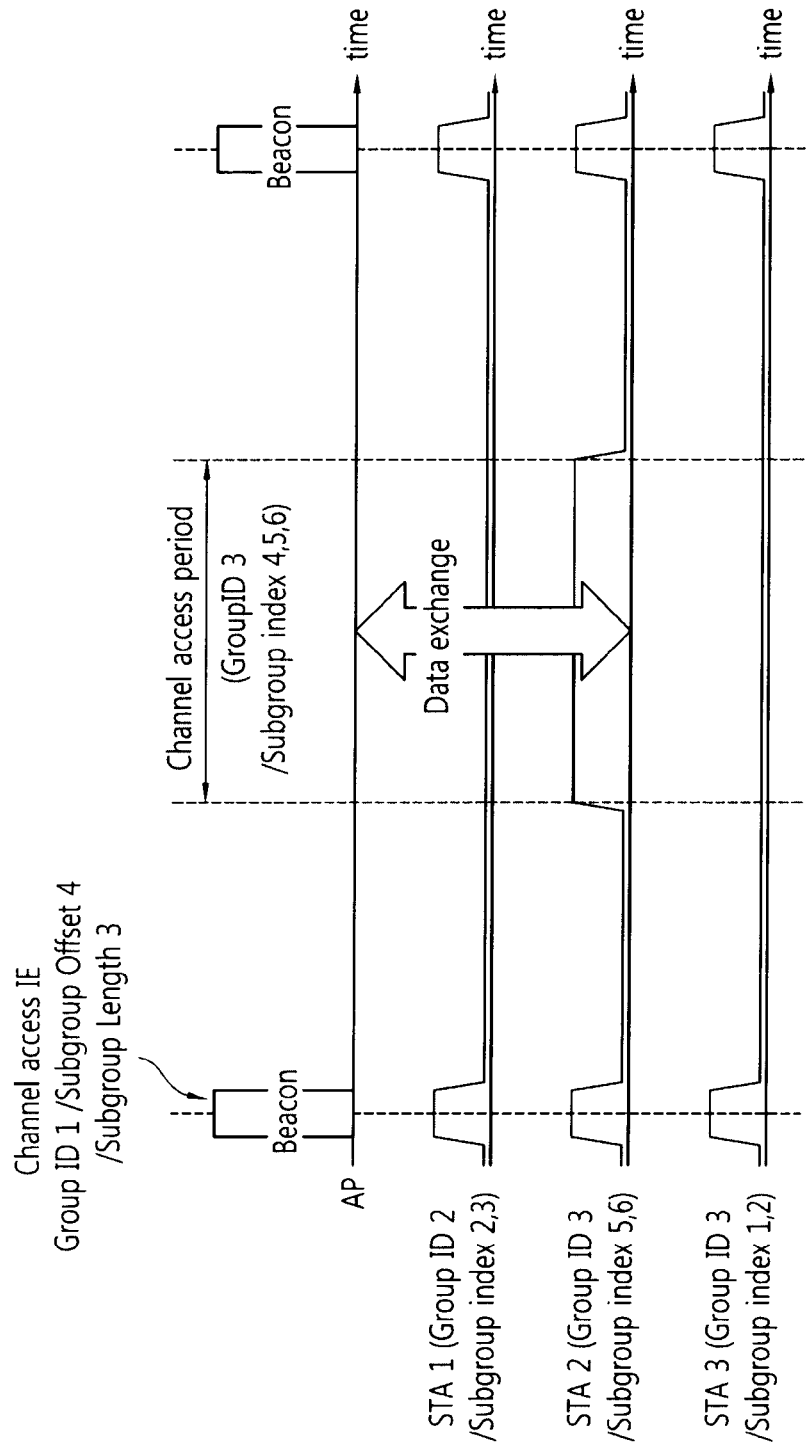
FIG. 26 is a diagram illustrating another example of a channel access method according to an embodiment of the present invention.

FIG. 26 is a diagram illustrating another example of a channel access method according to an embodiment of the present invention.

Referring to FIG. 26, STAs 1 include at least one STA included in STA sub-groups indicated by a group ID 2, a sub-group index 2, and a sub-group index 3. STAs 2 includes at least one STA included in STA sub-groups indicated by a sub-group index 5 and a sub-group index 6. STAs 3 includes at least one STA included in STA sub-groups indicated by a group ID 3, a sub-group index 1, and a sub-group index 2.

The STAs 1, the STAs 2, and the STAs 3 enter an awake state at a transmission time point of a beacon frame to receive the beacon frame, and a channel access information element of a format as illustrated in FIG. 19 is included in the beacon frame so that the beacon frame is transmitted. The STAs 1 to STAs 3 acquire information on the channel access period through the channel access information element.

The STAs 1 to STAs 3 may determine whether the channel access period therefor starts through a group ID field and a sub-group ID field of the channel access information element. The group ID field of the channel access information element indicates the group ID 3, and the sub-group offset sub-field indicates a sub-group index 4 and a sub-group length sub-field. Accordingly, it is understood that a corresponding channel access period is for STA sub-groups indicated by sub-group indexes 4, 5, and 6 of an STA group indicated a group ID 3.

Since the group ID field indicates the group ID 3, the STAs 1 confirms that the information is information on a channel access period therefor. Accordingly, the STAs 1 may maintain a sleep state to operate after reception of the beacon frame.

Since the group ID field indicates a group ID 3, and a sub-group offset of the sub-group ID field and a sub-group length sub-field indicates STA sub-groups according to sub-group indexes 4, 5, and 6, the STAs 2 may determine that information on the channel access period is information therefor. Accordingly, the STAs 2 enter an awake state at a time point indicated by a channel access period start field to exchange data with the AP during a duration time indicated by a channel access period duration field. If the channel access period is terminated, the STAs 2 again enter a sleep state.

Since the group ID field indicates the group ID 3 but sub-group offset of the sub-group ID field and the sub-group length sub-field indicate STA sub-groups according to sub-group indexes 4, 5, and 6, STAs 3 confirm that the formation is information on the channel access period therefor. Accordingly, the STAs 3 may maintain a sleep state to operate after reception of the beacon frame.

The above channel access method based on STA grouping may perform STA grouping based an AID of an STA to divide and assign channel access periods by STA groups. Each STA group or each STA sub-group may exchange data with the AP during a channel access period assigned thereto. Accordingly, a wireless LAN system with very many STAs may efficiently exchange the data by STA groups.

Meanwhile, when STA grouping is performed based on an AID and channel access is performed during a different channel access period for each STA group, or STA groups to which two STAs performing a TDLS are different from each other, a problem may occur during a procedure of performing the TDLS. For example, an STA1 to which a group ID1 is assigned and an STA 2 to which a group ID2 is assigned, since two STAs may perform channel access during different time periods, it may be difficult to efficiently transceive data. Accordingly, in order to perform the TDLS between two STAs, it is necessary to assign an AID to each STA so that the two STAs belong to different STA groups, respectively.

Two methods may be suggested as a method of performing this. First, during a TDLS setup procedure, STAs recognize that STA groups to which STAs belong are different from each other through information included in a TDLS setup request frame and a TDLS setup response frame and receive assignment of the same group ID to request change of an AID so that the STAs belong to the STA group. A current TDLS setup request frame and a current TDLS setup response frame include source AID information and destination AID, respectively. However, the current TDLS setup request frame and the current TDLS setup response frame do not include information on a group ID with a corresponding AID. Accordingly, in order to perform this, first, source group ID information may be added to a frame body of the TDLS setup request frame, and destination group ID information may be added to a frame body of the TDLS setup response frame. The source group ID information indicates a group ID of an STA transmitting a TDLS setup request frame, and the destination group ID information indicates a group ID of an STA transmitting the TDLS setup response frame.

A procedure of setting the TDLS using the TDLS setup request frame and the TDLS setup response frame including the information as described above will be described with reference to FIG. 27.

Figure 27:
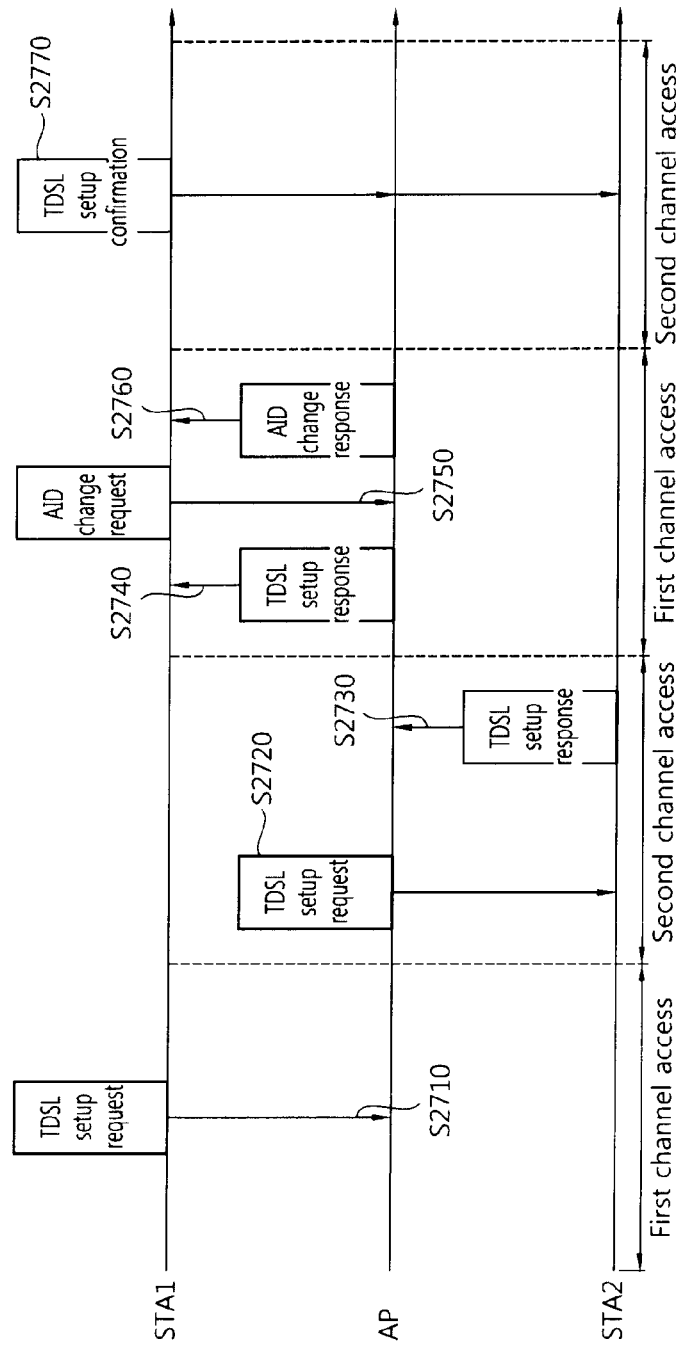
FIG. 27 is a diagram illustrating an example of a procedure of setting the TDLS according to an embodiment of the present invention.

FIG. 27 is a diagram illustrating an example of a procedure of setting the TDLS according to an embodiment of the present invention.

Referring to FIG. 27, when an STA1 receiving assignment of a group ID 1 and an STA2 receiving assignment of a group ID 2 transceive data through the TDLS, the STA1 transmits a TDLS setup request frame to the STA2 for TLDS setup during a first channel access period in which an STA group 1 identified by the group ID 1 may access a channel (S2710).

The TDLS setup request frame is transferred to the STA2 during a second channel access period which the STA2 included in an STA group 2 identified by a group ID 2 may access a channel through an AP (S2720).

The STA2 receiving the TDLS setup request frame transmits the TLDS setup response frame to the STA1 during the same channel access period (S2730). However, since the STA1 may not access the channel during the same channel access period, the STA1 receives the TDLS setup response frame during a next channel access period in which channel access is possible (S2740).

The STA1 recognizes that an STA group of the STA1 is different from an STA group of the STA2 and transmits an AID change request frame to the AP in order to request assignment of an AID so that the STA1 may belong to the same STA group as that of the STA2 (S2750). Meanwhile, the AID change request frame may be the same as the AID assignment request frame format as illustrated in FIG. 18.

The AP receiving a request from the STA1 transmits an AID change response frame to the STA1 in order to change an AID of the STA1 (S2760). Meanwhile, the AID change response frame format may be the same as the AID assignment with different group ID frame format as illustrated in FIG. 19.

The STA1 to which a new AID is assigned belongs to the same STA group as that of the STA2. Accordingly, a period which the STA1 may perform channel access is the same as that which the STA2 may perform channel access, and the STA1 transmits a TDLS setup confirmation frame to the STA2 during a corresponding channel access period (S2770). In this case, the TDLS setup confirmation response frame includes source group ID information so that it may be reported that STA1 is included in the same STA group as that of the STA2. Next, the STA1 and the STA2 may exchange data during a second channel access period through a set TDLS.

Although the STA1 may request assignment of an AID/group ID associated with change request of AID/group ID, the STA2 may request the assignment of an AID/group ID to the AP. The request procedure is illustrated in FIG. 28.

Figure 28:
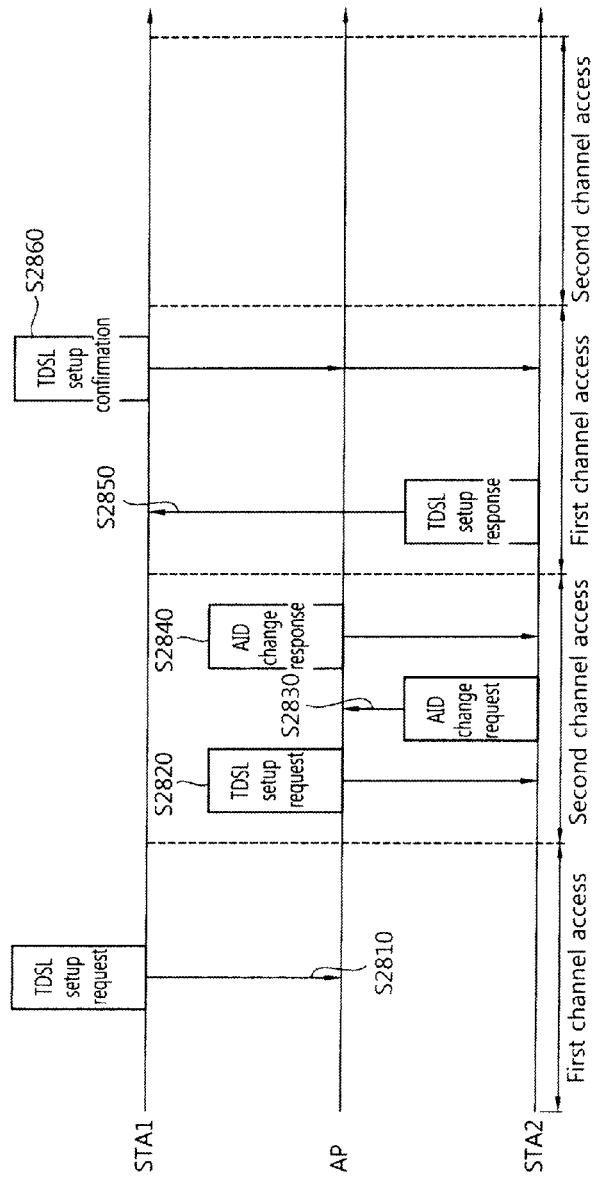
FIG. 28 is a diagram illustrating another example of a TDLS setup procedure according to an embodiment of the present invention.

FIG. 28 is a diagram illustrating another example of a TDLS setup procedure according to an embodiment of the present invention.

Referring to FIG. 28, STA1 transmits a TDLS setup request frame to STA2 for TDLS setup during a first channel access period when an STA group 1 identified by a group ID 1 may access a channel (S2810).

The TDLS setup request frame is transferred to the STA2 during a second channel access period when the STA2 included in an STA group 2 identified by a group ID 2 may access the channel through an AP (S2820).

The STA2 receiving the TDLS setup request frame may know an STA group to which the STA1 belongs through source group ID information of a corresponding frame, and may recognize that the STA group to which the STA1 belongs is different from an STA group to which the STA2 belongs. Accordingly, the STA2 transmits an AID change request frame to the AP in order to receive assignment of an AID assigned to an STA group according to the same group ID as that of the STA1 (S2830). The AID change request frame may be implemented by the AID assignment request frame format as illustrated in FIG. 18.

The AP receiving a request from the STA2 assigns a new AID to the STA2 by transmitting the AID change response frame to the STA2 (S2840). The AID change response frame may be the same as the AID assignment with different group ID frame format as illustrated in FIG. 19.

The STA2 to which a new AID is assigned belongs to the same STA group as that of the STA1. Accordingly, a period which the STA2 may perform channel access is the same as that which the STA1 may perform channel access, and the STA2 transmits a TDLS setup response frame to the STA2 during a corresponding channel access period (S2850). The STA1 may establish TDLS setup by transmitting a TDLS setup confirmation frame as a response thereof (S2860).

A second method of receiving assignment of an AID with respect to an STA group identified by the same group ID by two STAs in order to perform a TDLS between two STAs is a method where the two STAs receive assignment of the same group ID before performing TDLS setup. The second method may be performed as illustrated in FIG. 29.

Figure 29:
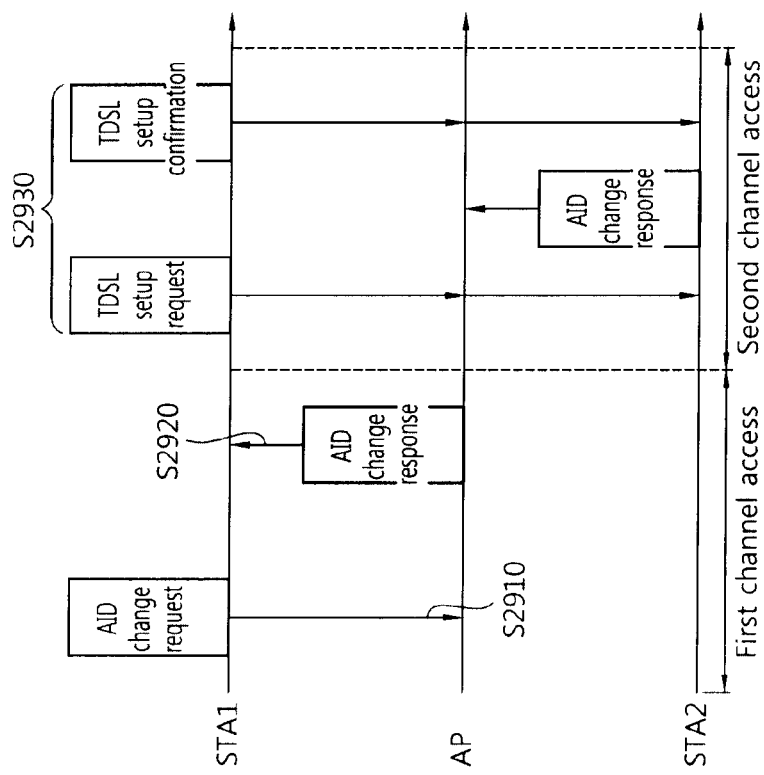
FIG. 29 is a diagram illustrating still another example of a TDLS setup procedure according to an embodiment of the present invention.

FIG. 29 is a diagram illustrating still another example of a TDLS setup procedure according to an embodiment of the present invention.

Referring to FIG. 29, STA1 accesses a channel during a first channel access period to transmit an AID change request frame requesting to assign an AID to the AP so that the STA may be included in the same STA group as that of the STA (S2910). In this case, the transmitted AID change request frame is illustrated in FIG. 30.

Figure 30:
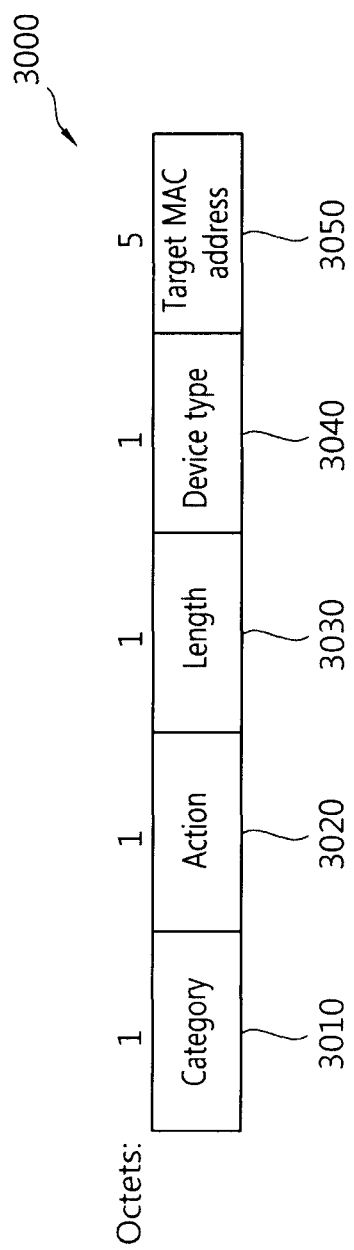
FIG. 30 is a block diagram illustrating an AID change request frame format according to an embodiment of the present invention.

FIG. 30 is a block diagram illustrating an AID change request frame format according to an embodiment of the present invention.

Referring to FIG. 30, an AID change request frame 3000 includes a category field 3010, an action field 3020, a length field 3030, a device type field 3040, and a target MAC address field 3050.

The category field 3010 and the action field 3020 may be set to indicate that a corresponding frame is the AID change request frame 3000.

The length field 3030 may be set to indicate a length of a bit sequence configuring fields included after the length field 3030 in the AID change request frame 3000.

The device type field 3040 includes device type related information of an STA transmitting the corresponding frame.

The target MAC address field 3050 may be set to indicate an MAC address of a destination STA for TDLS setup. Since STA1 cannot know a group ID of STA2, the STA1 may request to change an AID through an MAC address of a destination STA instead of requesting change of the AID according to a specific group ID.

Referring back to FIG. 29, the AP receiving the request reports information associated with a newly assigned AID through the AID change response frame (S2920). The AID change response frame format may be a frame format as illustrated in FIG. 19.

The STA1 belonging to the same STA group as that of the STA2 may perform TDLS setup and exchange a data frame with the STA2 during a second channel access period (S2930).

Figure 31:
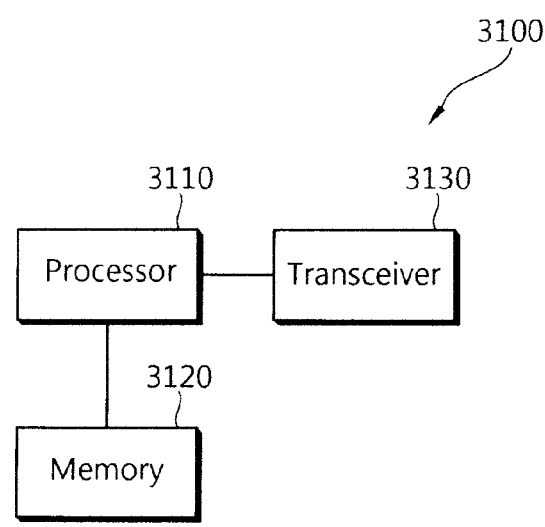
FIG. 31 is a block diagram illustrating a wireless apparatus according to the present invention.

FIG. 31 is a block diagram illustrating a wireless apparatus according to the present invention.

Referring to FIG. 31, the wireless apparatus 3100 includes a processor 3110, a memory 3120, and a transceiver 3130. The transceiver 3130 transmits and/or receives a wireless signal, and implements a physical layer of IEEE 802.11. The processor 3110 may be functionally connected to the transceiver 3130 to be operated. The processor 3110 may be set to implement an STA grouping-based data transceiving method shown in FIGS. 9 to 23.

The processor 3110 and/or the transceiver 3130 may include an Application-Specific Integrated Circuit (ASIC), another chipset, a logic circuit and/or a data processor. When an embodiment is implemented by software, the above scheme may be implemented by a module (procedure, function and the like) to perform the above function. The module is stored in the memory 3120 and may be executed by the processor 3110. The memory 3120 may be included inside the processor 3110. The memory 3120 is separately located outside the processor 3110 and may be functionally connected to the processor 3110 by various means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for allocating an association identifier (AID) in a wireless local area network, the method comprising:

transmitting, by a requesting station, an AID assignment request frame to an Access Point (AP) for requesting a station grouping, the AID assignment request frame including a duty cycle field and a target address field, the duty cycle field indicating a listen interval during which the requesting station wakes to receive a beacon frame, the target address field indicating a peer station with which the requesting station requests to be grouped, wherein when the requesting station and the peer station are grouped, both stations listen for beacon frames during a common time interval;

receiving, by the requesting station, an AID assignment response frame from the AP as a response to the AID assignment request frame;

receiving, by the requesting station, a beacon frame from the AP, the beacon frame including a traffic indication map (TIM) element that indicates, based on the assigned AID, whether the AP has buffered traffic for the requesting station, wherein the AID response frame includes an AID field and an AID activation offset field, wherein the AID field indicates an assigned AID identifying the requesting station so that the requesting station belongs to a station group with the peer station, and wherein the AID activation offset field indicates a time offset when the requesting station activates the assigned AID indicated by the AID field.

2. The method of claim 1, wherein the AID assignment request frame includes a device type information that indicates whether the requesting station transmits a frame without receiving a beacon frame to check that the AP has a buffered frame for the requesting station.

3. The method of claim 1, wherein the AID assignment request frame includes a duty cycle field that indicates an active duration or an inactive duration while the requesting station operates in a power save mode.

4. A station for allocating an association identifier (AID) in a wireless local area network, the station comprising:

a transceiver that transmits and receives a radio signal; and a processor that controls the transceiver to:

transmit an AID assignment request frame to an access point (AP) for requesting a station grouping, the AID assignment request frame including a duty cycle field a target address field, the duty cycle field indicating a listen interval during which the requesting station wakes to receive a beacon frame, the target address field indicating a peer station with which the station requests to be grouped, wherein when the station and the peer station are grouped, both stations listen for beacon frames during a common time interval;

receive an AID assignment response frame from the AP as a response to the AID assignment request frame; and receive a beacon frame from the AP, the beacon frame including a traffic indication map (TIM) element that indicates, based on the assigned AID, whether the AP has buffered traffic for the station, wherein the AID response frame includes an AID field and an AID activation offset field, wherein the AID field indicates an assigned AID identifying the requesting station so that the station belongs to a station group with the peer station, and wherein the AID activation offset field indicates a time offset when the station activates the assigned AID indicated by the AID field.

5. The station of claim 4, wherein the AID assignment request frame includes a device type information that indicates whether the requesting station transmits a frame without receiving a beacon frame to check that the AP has a buffered frame for the requesting station.

6. The station of claim 4, wherein the AID assignment request frame includes a duty cycle field that indicates an active duration or an inactive duration while the requesting station operates in a power save mode.

* * * * *